(12) United States Patent
Veerasamy et al.

(10) Patent No.: US 10,280,680 B2
(45) Date of Patent: May 7, 2019

(54) VACUUM INSULATING GLASS (VIG) UNIT WITH PUMP-OUT PORT SEALED USING METAL SOLDER SEAL, AND/OR METHOD OF MAKING THE SAME

(71) Applicant: Guardian Glass, LLC, Auburn Hills, MI (US)

(72) Inventors: Vijayen S. Veerasamy, Ann Arbor, MI (US); Patricia Tucker, Carleton, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 106 days.

(21) Appl. No.: 15/170,265

(22) Filed: Jun. 1, 2016

(65) Prior Publication Data

US 2017/0002603 A1    Jan. 5, 2017

Related U.S. Application Data

(60) Provisional application No. 62/187,797, filed on Jul. 1, 2015.

(51) Int. Cl.
| | |
|---|---|
| *E06B 3/673* | (2006.01) |
| *E06B 3/66* | (2006.01) |
| *E06B 3/663* | (2006.01) |
| *E06B 3/677* | (2006.01) |

(52) U.S. Cl.
CPC ........ *E06B 3/67334* (2013.01); *E06B 3/6612* (2013.01); *E06B 3/66304* (2013.01); *E06B 3/66357* (2013.01); *E06B 3/6775* (2013.01); *E06B 3/6736* (2013.01); *Y02A 30/25* (2018.01); *Y02B 80/24* (2013.01)

(58) Field of Classification Search
CPC .. E06B 3/6612; E06B 3/6775; E06B 3/67334; E06B 3/6736; Y02B 80/24
See application file for complete search history.

(56) References Cited

U.S. PATENT DOCUMENTS

| | | | |
|---|---|---|---|
| 49,167 | A | 1/1865 | Stetson |
| 1,370,974 | A | 3/1921 | Kirlin |
| 1,448,351 | A | 3/1923 | Kirlin |

(Continued)

FOREIGN PATENT DOCUMENTS

| | | |
|---|---|---|
| DE | 2951330 | 7/1981 |
| DE | 10 2007 029 031 A1 | 12/2008 |

(Continued)

OTHER PUBLICATIONS

Product Data Sheet for Precision Spheres for BGAs (PGBA, CBGA, and TBGA), Indium Corporation of America (4 pp.).

(Continued)

*Primary Examiner* — Donald J Loney
(74) *Attorney, Agent, or Firm* — Nixon & Vanderhye P.C.

(57) ABSTRACT

Certain example embodiments relate to vacuum insulating glass units having pump-out hole seals formed in connection with solder alloys that, when reactively reflowed, wet pre-coated metallic coatings, and/or associated methods. The alloys may be based on materials that form seals at temperatures that will not de-temper glass and/or decompose a laminate, and/or remain hermetic and lack porous structures in their bulks. SAC, InAg, and/or other preform materials may be used in different example embodiments.

7 Claims, 18 Drawing Sheets

(56) References Cited

U.S. PATENT DOCUMENTS

| | | |
|---|---|---|
| 1,774,860 A | 9/1930 | Wendler et al. |
| 2,011,557 A | 8/1935 | Anderegg |
| 2,303,897 A | 12/1942 | Smith |
| 2,962,409 A | 11/1960 | Ludlow et al. |
| 3,441,924 A | 4/1969 | Peek et al. |
| 3,742,600 A | 7/1973 | Lowell |
| 3,857,161 A | 12/1974 | Hutchins, IV |
| 3,902,883 A | 9/1975 | Bayer |
| 3,912,365 A | 10/1975 | Lowell |
| 3,936,553 A | 2/1976 | Rowe |
| 3,959,577 A | 5/1976 | Frink |
| 3,990,201 A | 11/1976 | Falbel |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,393,105 A | 7/1983 | Kreisman |
| 4,422,280 A | 12/1983 | Mertin et al. |
| 4,486,482 A | 12/1984 | Kobayashi et al. |
| 4,514,450 A | 4/1985 | Nowobilski et al. |
| 4,542,611 A | 9/1985 | Day |
| 4,586,289 A | 5/1986 | Jaeger |
| 4,598,520 A | 7/1986 | Ellstrom |
| RE32,272 E | 10/1986 | Funaki et al. |
| 4,683,154 A | 7/1987 | Benson et al. |
| 4,780,164 A | 10/1988 | Rueckheim et al. |
| 4,786,344 A | 11/1988 | Beuther |
| 4,822,649 A | 4/1989 | Canaud et al. |
| 4,824,215 A | 4/1989 | Joseph et al. |
| 4,853,264 A | 8/1989 | Vincent et al. |
| 4,865,672 A | 9/1989 | Delbeck et al. |
| 4,874,461 A | 10/1989 | Sato et al. |
| 4,886,095 A | 12/1989 | Lisec |
| 4,909,874 A | 3/1990 | Rueckheim |
| 4,909,875 A | 3/1990 | Canaud et al. |
| 4,924,243 A | 5/1990 | Sato et al. |
| 4,928,448 A | 5/1990 | Phillip |
| 4,983,429 A | 1/1991 | Takayanagi et al. |
| 5,005,557 A | 4/1991 | Bachli |
| 5,017,252 A | 5/1991 | Aldrich et al. |
| 5,027,574 A | 7/1991 | Phillip |
| 5,124,185 A | 6/1992 | Kerr et al. |
| 5,157,893 A | 10/1992 | Benson et al. |
| 5,175,975 A | 1/1993 | Benson et al. |
| 5,234,738 A | 8/1993 | Wolf |
| 5,247,764 A | 9/1993 | Jeshurun et al. |
| 5,270,084 A | 12/1993 | Parker |
| 5,271,973 A | 12/1993 | Huether |
| 5,313,761 A | 5/1994 | Leopold |
| 5,315,797 A | 5/1994 | Glover et al. |
| 5,366,574 A | 11/1994 | Lenhardt et al. |
| 5,399,406 A | 3/1995 | Matsuo et al. |
| 5,489,321 A | 2/1996 | Tracy et al. |
| 5,494,715 A | 2/1996 | Glover |
| 5,499,128 A | 3/1996 | Hasegawa et al. |
| 5,596,891 A | 1/1997 | Soucy |
| 5,657,607 A | 8/1997 | Collins et al. |
| 5,664,395 A | 9/1997 | Collins et al. |
| 5,739,882 A | 4/1998 | Shimizu et al. |
| 5,753,069 A | 5/1998 | Rueckheim |
| 5,855,638 A | 1/1999 | Demars |
| 5,891,536 A | 4/1999 | Collins et al. |
| 5,897,927 A | 4/1999 | Tsai et al. |
| 5,902,652 A | 5/1999 | Collins et al. |
| 6,049,370 A | 4/2000 | Smith, Jr. et al. |
| 6,238,755 B1 | 5/2001 | Harvey |
| 6,261,652 B1 * | 7/2001 | Poix ............ E06B 3/6612 428/34 |
| 6,383,580 B1 | 5/2002 | Aggas |
| 6,468,610 B1 | 10/2002 | Morimoto et al. |
| 6,506,472 B1 | 1/2003 | Yoshinori et al. |
| 6,946,171 B1 | 9/2005 | Aggas |
| 7,204,102 B1 * | 4/2007 | Eames ............ C03C 27/08 65/36 |
| 8,857,698 B2 | 10/2014 | Bouesnard et al. |
| 8,984,909 B2 | 3/2015 | Li et al. |
| 9,290,984 B2 | 3/2016 | Hogan et al. |
| 2006/0187608 A1 | 8/2006 | Stark |
| 2009/0155500 A1 | 6/2009 | Cooper et al. |
| 2011/0139857 A1 | 6/2011 | Hagen |
| 2012/0304696 A1 | 12/2012 | Miller et al. |
| 2013/0074445 A1 | 3/2013 | Jones |
| 2013/0136875 A1 | 5/2013 | Veerasamy |
| 2013/0153550 A1 | 6/2013 | Dear |
| 2013/0153551 A1 | 6/2013 | Dear |
| 2013/0292000 A1 | 11/2013 | Dennis et al. |
| 2013/0302542 A1 | 11/2013 | Jones |
| 2013/0305785 A1 | 11/2013 | Dennis et al. |
| 2013/0306222 A1 | 11/2013 | Dennis et al. |
| 2013/0309425 A1 | 11/2013 | Dennis et al. |
| 2014/0034218 A1 | 2/2014 | Hogan et al. |
| 2014/0037869 A1 | 2/2014 | Petrmichl et al. |
| 2014/0037870 A1 | 2/2014 | Petrmichl et al. |
| 2014/0087099 A1 | 3/2014 | Veerasamy et al. |
| 2015/0184446 A1 | 7/2015 | Veerasamy et al. |
| 2015/0300077 A1 | 10/2015 | Veerasamy et al. |

FOREIGN PATENT DOCUMENTS

| | | |
|---|---|---|
| EP | 0047725 | 12/1985 |
| EP | 0489042 | 6/1992 |
| EP | 0645516 | 3/1995 |
| EP | 0812696 | 12/1997 |
| EP | 0831073 | 3/1998 |
| FR | 2 482 161 | 11/1981 |
| FR | 2 752 012 | 6/1998 |
| WO | WO 97/00335 | 1/1997 |
| WO | WO 99/47466 | 9/1999 |
| WO | WO 01/75260 | 10/2001 |
| WO | WO 2013/017345 | 2/2007 |
| WO | WO 2011/063704 | 6/2011 |
| WO | WO 2012/058938 | 5/2012 |
| WO | WO 2012/170566 | 12/2012 |
| WO | WO 2015/102993 | 7/2015 |

OTHER PUBLICATIONS

Product Data Sheet for NC-SMQ® 80 Solder Paste, Indium Corporation of America (2 pp.).

Brochure for "Research Solder Kits," Indium Corporation of America (6 pp.) at least as early as Dec. 31, 2013.

Griffiths et al., "Fabrication of Evacuated Glazing at Low Temperature," Solar Energy, vol. 63, pp. 243-249 (7 pp.).

PCT International Search Report issued in Application No. PCT/US/00/40300, dated Oct. 27, 2000 (4 pp.).

"Thermal Outgassing of Vacuum Glazing," by Lenzen, et al., School of Physics, Univ. of Sydney, NSW 2006 Australia (31 pp.).

"Temperature-Induced Stresses in Vacuum Glazing: Modelling and Experimental Validation" by Simko et al., Solar Energy, vol. 63, No. 1, pp. 1-21, 1998 (21 pp.).

"Current Status of the Science and Technology of Vacuum Glazing," by Collins, et al., Solar Energy, vol. 62, No. 3, pp. 189-213, 1998 (26 pp.).

Brochure for "Specialty Solders and Alloys, Technical Information" for Indium Corporation of America (6 pp). at least as early as Dec. 31, 2013.

International Search Report for PCT/US2014/071875 dated Apr. 15, 2015 (4 pp).

* cited by examiner

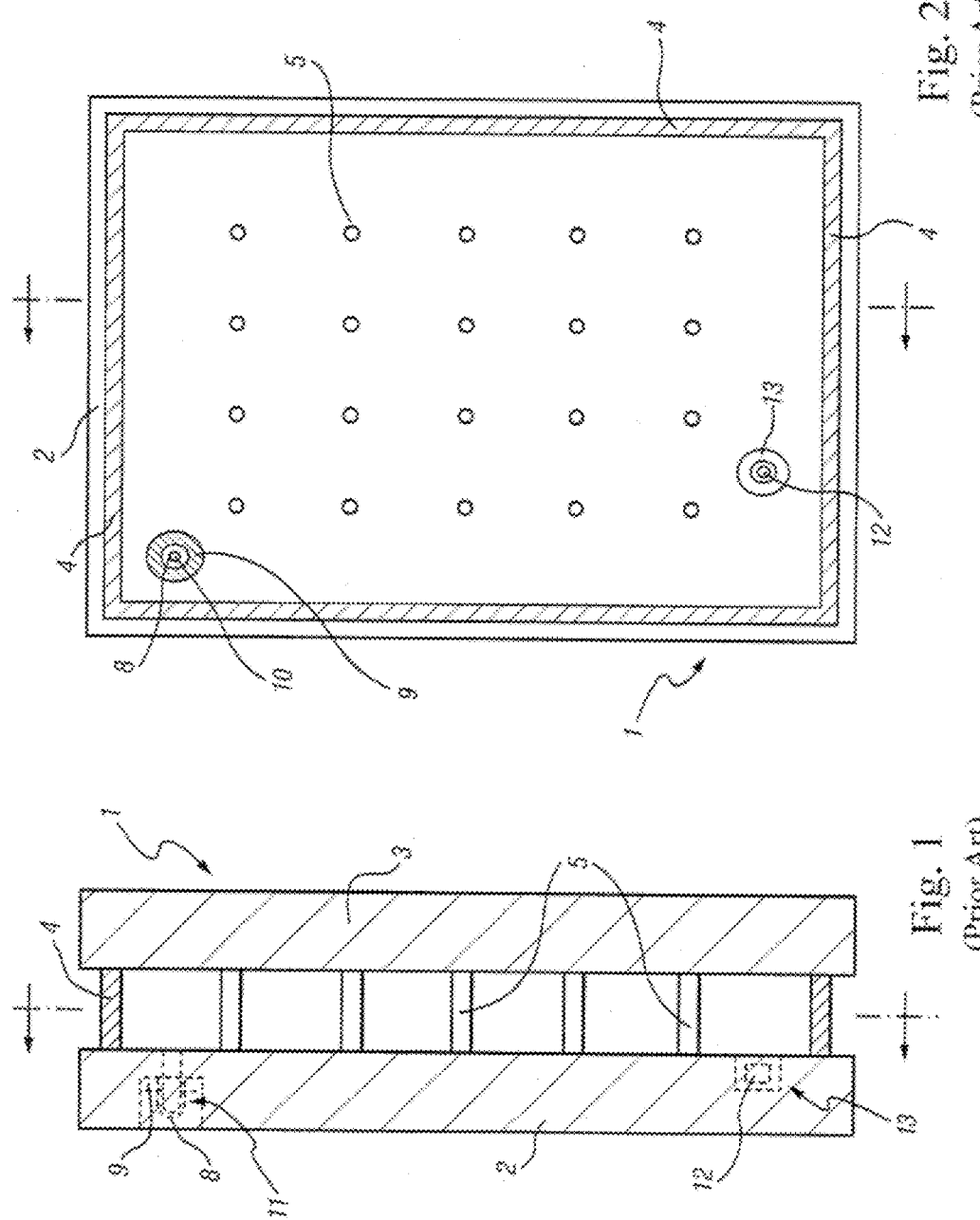

VACUUM INSULATING GLASS (VIG) UNIT WITH PUMP-OUT PORT SEALED USING METAL SOLDER SEAL, AND/OR METHOD OF MAKING THE SAME

CROSS-REFERENCE TO RELATED APPLICATION

This application claims the benefit of U.S. Application Ser. No. 62/187,797 filed on Jul. 1, 2015, the entire contents of which are hereby incorporated herein by reference.

This application also incorporates by reference the entire contents of each of U.S. application Ser. No. 14/145,462 filed on Dec. 31, 2013, and U.S. application Ser. No. 14/789,444 filed on Jul. 1, 2015.

FIELD OF THE INVENTION

Certain example embodiments of this invention relate to vacuum insulating glass (VIG or vacuum IG) units, and/or methods of making the same. More particularly, certain example embodiments of this invention relate to VIG units having pump-out hole seals formed in connection with metallic solder pre-form alloys that, when reactively reflowed, wet and bond with metallic pre-coated coatings, and/or associated methods.

BACKGROUND AND SUMMARY OF EXAMPLE EMBODIMENTS OF THE INVENTION

Hermetic sealing of glass substrates to create a vacuum or inert gas environment therebetween is typically made possible using barriers of usually glassy or metallic (e.g., eutectic) materials that are impermeable to ingress of gasses over a long time period, typically many orders of magnitude longer than the device operating lifetime. As will be understood, permeability typically involves two steps. These steps include dissolution and diffusion. Hermetic sealing helps keep, for example, water, other liquids, oxygen and other gaseous contaminant molecules out of packages that hold, for example, and without limitation, a vacuum (e.g., VIG window units, thermos flask, MEMS, and the like), or sensitive materials, such as, for example, and without limitation, organic emitting layers (e.g., used in OLED devices), semiconductor chips, sensors, optical components, or the like, held in an inert atmosphere. Gas tight packaging of the complex interiors of such assemblies has posed obstacles in the later stages of processing of such packages such as, for example, prior to pumping and tip fusing in the case of VIG window units, last processing steps in the manufacture of OLED devices, etc.

Some example VIG configurations are disclosed, for example, in U.S. Pat. Nos. 5,657,607, 5,664,395, 5,657,607, 5,902,652, 6,506,472 and 6,383,580, the disclosures of which are all hereby incorporated by reference herein in their entireties.

FIGS. 1 and 2 illustrate a typical VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2,3 are interconnected by a peripheral edge seal 4 that may be made of fused solder glass or the like, for example. An array of support pillars/spacers 5 may be included between the glass substrates 2, 3 to maintain the spacing of substrates 2, 3 of the VIG unit 1 in view of the low-pressure space/gap 6 present between the substrates 2, 3.

A pump-out tube 8 may be hermetically sealed by, for example, solder glass 9 or the like to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate the interior cavity 6 to a low pressure that is less than atmospheric pressure, for example, using a sequential pump down operation. After evacuation of the cavity 6, a portion (e.g., the tip) of the tube 8 is melted to seal the vacuum in low pressure cavity/space 6. The optional recess 11 may retain the sealed pump-out tube 8. Optionally, a chemical getter 12 may be included within a recess 13 that is disposed in an interior face of one of the glass substrates, e.g., glass substrate 2. The chemical getter 12 may be used to absorb or bind with certain residual impurities that may remain after the cavity 6 is evacuated and sealed. The getter 12 also acts in a manner so as to "mop up" gaseous impurities that may evolve during the environmental weathering of the unit.

VIG units with peripheral hermetic edge seals 4 (e.g., solder glass) are typically manufactured by depositing glass frit or other suitable material in a solution (e.g., frit paste) around the periphery of substrate 2 (or on substrate 3). This glass frit paste ultimately forms the edge seal 4. The other substrate (e.g., 3) is brought down on substrate 2 so as to sandwich spacers/pillars 5 and the glass frit solution between the two substrates 2, 3. The entire assembly including the glass substrates 2, 3, the spacers/pillars 5 and the seal material (e.g., glass frit in solution or paste), is then typically heated to a temperature of at least about 500° C., at which point the glass frit melts, wets the surfaces of the glass substrates 2, 3, and ultimately forms a hermetic peripheral/edge seal 4.

After formation of the edge seal 4 between the substrates, a vacuum is drawn via the pump-out tube 8 to form low pressure space/cavity 6 between the substrates 2, 3. The pressure in space/cavity 6 may be produced by way of an evacuation process to a level below atmospheric pressure, e.g., below about $10^{-4}$ Torr. To maintain the low pressure in the space/cavity 6, substrates 2, 3 are hermetically sealed via the edge seal and sealing off of the pump-out tube. Small high strength spacers/pillars 5 are provided between the transparent glass substrates to maintain separation of the approximately parallel glass substrates against atmospheric pressure. As noted above, once the space 6 between substrates 2, 3 is evacuated, the pump-out tube 8 may be sealed, for example, by melting its tip using a laser or the like.

High-temperature bonding techniques such as, for example, anodic bonding and glass frit bonding, as discussed above, have been widely used method for hermetically sealing (e.g., forming an edge seal) components made of silicon, ceramics, glass, or the like. The heat required for these high-temperature processes is typically in the range of about 300-600 degrees C. These conventional bonding techniques typically require oven-intensive bulk heating in which the entire device (including the glass and any components housed within the glass housing) comes to near thermal equilibrium with the oven for a seal to form. As a result, a relatively long period of time is required to achieve an acceptable seal. For example, as the device size L increases, the sealing time may typically increase on the order of $L^3$. It is also the case that the most temperature sensitive component determines the maximum allowable temperature of the entire system. Thus, high-temperature sealing processes discussed above (e.g., anodic bonding and glass frit bonding) are not suitable for fabricating heat-sensitive components such as, for example, tempered VIG units and encapsulating sensitive components, such as, for example, OLED devices. In the case of tempered VIG units, the thermally tempered glass substrates of a VIG unit would rapidly lose temper strength in the high-temperature environment. In the case of an example OLED package, certain functional organic layers would be destroyed at temperatures of 300-600 degrees C. (sometimes even as low as 100° C.). In the past, one way to address this with high-temperature bulk sealing processes was to develop lower temperature frits, while still using bulk thermal equilibrium heating processes.

By way of background, glass frits and/or solders are typically mixtures of glass material and metallic oxides. Glass composition may be tailored to match the coefficient of thermal expansion (CTE) of the bonding substrates. Lead-based glasses are the most common bonding/sealing material/technique used commercially in cathode ray tubes (CRT), plasma displays and VIG window units. Lead-based glass frits are also among the least permeable glass sealing materials. Traditionally, these solders are based on glassy materials and de-vitrification is suppressed.

Glass frits or solders are typically made up of a base glass, a refractory filler and a vehicle. The base glass forms the bulk of the frit or solder. The filler reduces the CTE as well as matching it to the glass substrates to be joined. This matching enhances the mechanical strength, reduces interfacial stress and improves the crack resistance of the seal. The vehicle is typically made of a solvent (with surfactants) that provides fluidity for screen printing (e.g., for dispensing into gaps to be sealed and/or onto a surface to be sealed) and an organic binder.

Among one advantages of these types of glass frits or solders is that they include a relatively low melting point (e.g., in a range of about 480-520 degrees C.) glass that will stick to most semiconductor materials including, but not limited to, glass, silicon, silicon oxide, most metals and ceramics, making bonding techniques using these types of materials versatile and widely accepted.

There are many different types of commercially available glass frit materials having various melting points, CTEs, binders, and screen printing properties. However, almost all lower melting point formulations of glass frit or solder contain some lead. This may potentially become a drawback, as the U.S., EU, and Japan, for example, are severely limiting, if not forbidding, the use of lead in electronics manufacturing in the coming years. In the last few years, frits or solders based on bismuth oxides have had some success in replacing lead based frits, however the melting temperature (Tg) of these types of frits is still typically above about 450 degrees C. As with lead based frits, these bismuth oxide based frits cannot be used for fabrication of temperature sensitive devices using conventional oven bulk heating processes. Lower Tg (e.g., 375-390 degrees C.) frits based on vanadium barium zinc oxides (VBZ) have also been developed, including, but not limited to, VBaZn, V phosphates, $SnZnPO_4$. However, widespread usage of these types of frits has been limited. Moreover, although such glass fits are an improvement over conventional approaches, they sometimes still have difficulties meeting stringent thermo-mechanical requirement of a low temperature all-glass peripheral seal. This is caused in part because low temperature glass solders usually are made of large ionic radii species do not readily diffuse into the glass surface at low processing temperatures and times.

Of course, it also will be appreciated that it would be desirable to provide VIG units capable of surviving harsh environments, e.g., those typically characterized by high operational temperatures, as well as exposure to shocks and vibrations, humidity, contaminants, radiation, and/or the like. For instance, the glazing industry subject materials to harsh environments with each extreme use posing its own challenges. For example, in skylights, glazing systems are subjected to extreme temperatures (150 degrees C.) and shocks and vibration loading related to wind loads. Indeed, ambient temperature near the VIG seal can reach in excess of 150 degrees C. with shock and vibration loading, and the ambient temperature in a building facade can be as high as 200 degrees C. Thus, it is challenging to provide an edge seal that provides long-term hermeticity, mechanical strength, and low possible thermal pathways.

Thus, it will be appreciated there is a need in the art for a seal processing technique that does not involve heating the entire article to be sealed to high temperature(s), and/or articles made in such example manners.

In certain example embodiments, a method of making a vacuum insulated glass (VIG) unit is provided. A VIG unit subassembly includes first and second glass substrates, a plurality of spacers helping to maintain the first and second glass substrates in substantially parallel spaced apart relation to one another, and an edge seal. The first glass substrate has a hole formed therein, with the hole being usable to evacuate a cavity defined between the first and second glass substrates. A first multi-layer thin film coating is formed on a portion of the first substrate that is around and/or on an inner diameter of the hole, with the first multi-layer thin film coating including at least one layer comprising a metal. A solid solder alloy pre-form is provided in and/or around the hole, with the solid solder alloy pre-form being in direct physical contact with at least a part of the first multi-layer thin film coating and comprising metal. A seal member is provided over and/or in hole so that at least part of the seal member is in physical contact with the solid solder alloy pre-form. An hermetic hole seal is formed by reactively reflowing the solid solder alloy pre-form to cause material from the first multi-layer thin film coating to diffuse into the solder alloy material and vice versa, in making the VIG unit.

According to certain example embodiments, the seal member may have a second multi-layer thin film coating formed thereon, with the first and second layer thin film coatings at least initially having the same thin film layers; and the solid solder alloy pre-form may be in direct physical contact with at least a part of the second multi-layer thin film coating. The forming of the hermetic hole seal also may cause material from the second multi-layer thin film coating to diffuse into the solder alloy material and vice versa, in making the VIG unit According to certain example embodiments, the seal member may be a plug that is inserted into the hole, a plate that covers the hole, a plate with a plug protruding therefrom where the plate covers the hole and the plug extends into the hole, etc. The seal member may be formed from a metal, metal alloy, and/or glass.

According to certain example embodiments, multi-layer thin film coatings may metallize the substrate around and/or in the hole, and/or the seal member. Such multi-layer thin film coatings may include a layer comprising Ni (e.g., a Ni/Ag/Ni layer stack, a Ni/Ag layer stack, an Si/Ni/Ag layer stack, and/or the like). The layer comprising Ni may be a NiCr-inclusive layer.

According to certain example embodiments, the solid solder alloy pre-form may be formed from an indium silver alloy, SAC, Sn—Pb, SnBiAg, SATi, SATiRE, etc. In other cases, the solid solder alloy pre-form may be based on Sn and include at least one other material selected from the group consisting of post-transition metals or metalloids; Zintl anions from group 13, 14, 15, or 16; and transition metals.

According to certain example embodiments, the hole seal may be sealed while the VIG unit subassembly is held under vacuum. In some cases, the edge seal may be formed while the VIG unit subassembly is held under a first vacuum pressure, the hole seal may be formed while the VIG unit subassembly is held under a second vacuum pressure, and the second vacuum pressure may be lower than the first vacuum pressure.

According to certain example embodiments, the hole seal may be formed at a temperature of no more than 300 degrees C., more preferably no more than 180 degrees C., and sometimes no more than 160 degrees C.

According to certain example embodiments, the VIG unit may be made without a pump-out tube that needs to be tipped-off or otherwise closed.

In certain example embodiments, a VIG may be made using the methods described herein.

In certain example embodiments, a VIG unit comprises first and second substantially parallel spaced apart glass substrates, with at least one of the first and second substrates being a heat treated glass substrate; a plurality of spacers provided between the first and second substrates; an edge seal; and a cavity at least partially defined by the first and second substrates and the edge seal, with the cavity being evacuated to a pressure less than atmospheric. A hole seal member is provided in and/or over a hole formed in the first substrate that was used during VIG unit manufacturing to evacuate the cavity. The hole seal member and the first substrate are hermetically sealed to one another via a hole seal formed by reactively reflowing a solid solder alloy pre-form comprising metal, which causes (a) material from a first multi-layer thin film coating pre-provided on the first substrate to diffuse into the solder alloy material and vice versa, and (b) formation of an inter-metallic compound (IMC) between an uppermost layer of the first multi-layer thin film coating and the reactively reflowed solder.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a cross-sectional view of a conventional vacuum IG unit;

FIG. 2 top plan view of the bottom substrate, edge seal, and spacers of the FIG. 1 vacuum insulating glass (VIG) unit taken along the section line illustrated in FIG. 1;

Figure 3:
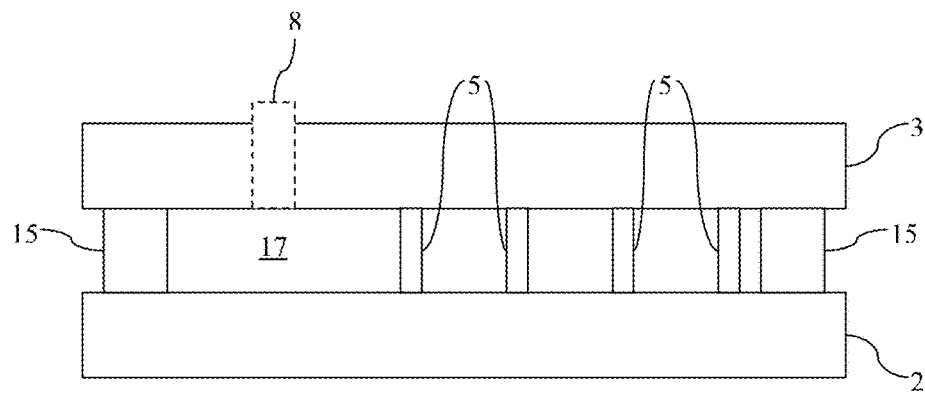
FIG. 3 is a cross-sectional view of a VIG unit according to certain example embodiments.

DETAILED DESCRIPTION OF EXAMPLE
EMBODIMENTS OF THE INVENTION

Certain example embodiments relate to a vacuum insulating glass (VIG) unit provided with a metal-inclusive peripheral edge hermetic seal, and/or methods of making the same. The edge seal is formed in connection with a metallic solder pre-form alloy that, when reactively reflowed, wets a metallic coating pre-coated on the glass substrates' perimeters. The use of these techniques advantageously permit low processing temperatures, e.g., through the careful selection of solder-coating combinations. This may in certain example embodiments advantageously allow thermally tempered glass to be used in VIG units without significantly sacrificing the temper strength of the glass during the fabrication process, permit sputtered soft low emissivity (low-E) coatings to be used, enable thin film getter materials to be provided, etc. In certain example embodiments, it advantageously becomes possible to form a vacuum without the use of a pump-out tube or the like.

More particularly, certain example embodiments form edge seals using alloys based on Sn, post-transition metals or metalloids from Group 13, 14, 15, or 16, and Zintl anions, as well as transition metal dopants, that (a) readily wet the coated glass, (b) have the desirable rheological properties in terms of forming a seal at temperatures that will not de-temper glass and/or decompose a laminate, and/or (c) remain hermetic and lack a porous structure in its bulk. A thin film coating on glass may in certain example embodiments work with the Sn-based inter-metallic solder material to form robust and durable hermetic interfaces. By energizing the seal appropriately, it is possible to reduce the presence of bubbles (e.g., micro-bubbles), voids, and/or other defects in the seal. And because the process is a low temperature process, certain example embodiments can use compliant and visco-elastic spacer (e.g., pillar) technology based on naturally occurring lamellar polymeric structures (e.g., of the de Gennes class).

One aspect of certain example embodiments relates to the development and use of a new class of alloys based on metal and metalloid solder materials that readily wet the glass and have rheological properties sufficient to form a seal at temperatures that will not de-temper glass and will not decompose a laminate, while the formed seal is hermetic and lacks a porous structure in its bulk.

Another aspect of certain example embodiments relates to the development and use of a thin film coating or layer stack provided on the glass substrates that, together with the solder, forms robust and durable interfaces that are hermetic. The thin film coating or layer stack preferably is reactively wetted and inter-mixed in a very short time by the metal solder.

Another aspect of certain example embodiments relates to the development and use of electrical and/or radiation means (e.g., radiant heat, forced convective heating, and inductive as well as resistive heating, etc.) of energizing the seal, potentially in-vacuo, to form a homogeneous seal structure that lacks bubbles and defects. A combination of such means of energizing the seal formation in a time that limits the formation of an inter-metallic compound (IMC) has been found to be advantageous in achieving and/or maintaining hermeticity.

Still another aspect of certain example embodiments relates to the development and use of compliant and visco-elastic spacer/pillar technology, e.g., based on naturally occurring lamellar structures (such as, for example, of the de Gennes class).

In certain example embodiments, these example aspects can be combined in any suitable combination or sub-combination.

Advantageously, certain example embodiments may have a higher R-value or lower U-value than what is currently attainable, e.g., because the low temperature process may allow for compliant and thermally insulating spacers/pillars that may, for instance, be spaced further apart.

In certain example embodiments, the process, including the sealing process, preferably does not exceed 350 degrees C., more preferably does not exceed 300 degrees C., and still more preferably does not exceed 250 degrees C.

Referring now more particularly to the drawings in which like reference numerals indicate like parts throughout the several views, FIG. 3 is a cross-sectional view of a VIG unit according to certain example embodiments. It will be appreciated that the FIG. 3 example embodiment is similar to that shown in connection with FIGS. 1-2. For instance, first and second substrates (e.g., glass substrates) 2 and 3 are provided in substantially parallel spaced apart relation to one another. A plurality of spacers (e.g., pillars or the like) 5 help maintain the first and second substrates 2 and 3 in this orientation. A pump-out port 8 is provided in this example embodiment; however, as will be described in greater detail below, certain example embodiments may form a vacuum in the cavity 17 without the presence of such a port 8.

Figure 4:
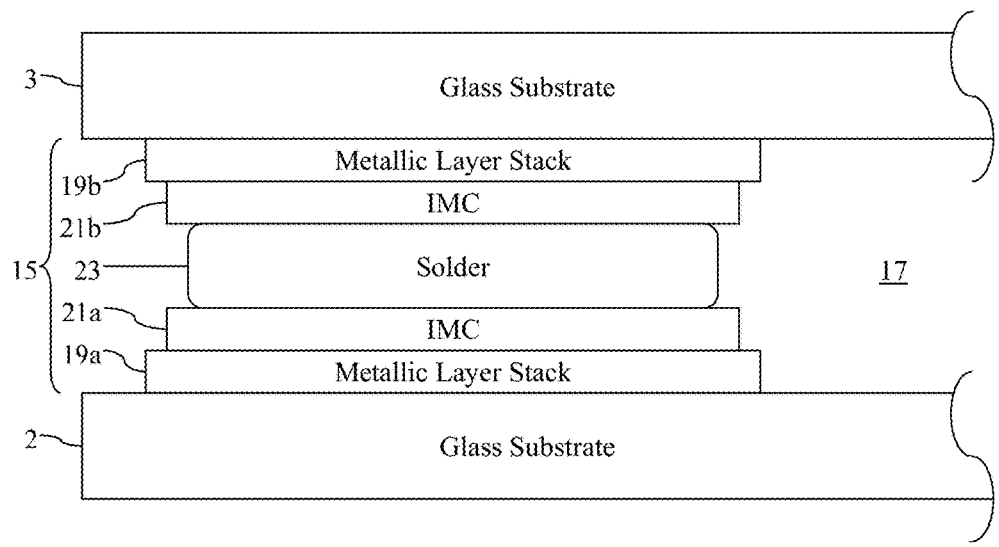
FIG. 4 is an enlarged view of an end-portion of FIG. 3, in accordance with certain example embodiments.

The FIG. 3 example embodiment differs from the VIG unit shown in FIGS. 1-2 in that it includes an improved edge seal 15. More particularly, the improved edge seal 15 is formed in connection with a metallic solder pre-form alloy that, when reactively reflowed, wets metallic coatings pre-coated on the glass substrates, e.g., at peripheral edges thereof. In this regard, FIG. 4 is an enlarged view of an end-portion of FIG. 3, in accordance with certain example embodiments. First and second metallic layer stacks 19a and 19b are respectively provided on the first and second substrates 2 and 3. A solder pre-form is melted and forms a band of solder 23 that comprises the bulk of the seal, at least in terms of volume. The solder 23 is bonded with the first and second metallic layer stacks 19a and 19b via first and second inter-metallic compounds (IMCs) 21a and 21b, respectively. As will be described in greater detail below, the edge seal 15 may be formed under vacuum conditions and provide a good hermetic seal.

Figure 5:
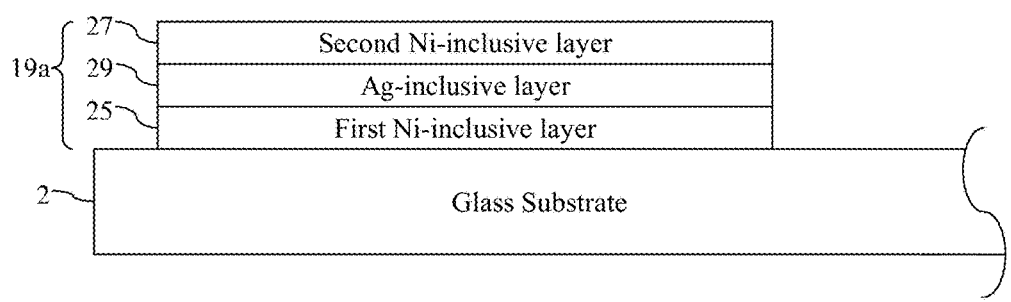
FIG. 5 is an enlarged view of the metallic layer stack formed on the first substrate, as shown in FIG. 4, in accordance with certain example embodiments.

FIG. 5 is an enlarged view of the first metallic layer stack 19a formed on the first substrate 2, as shown in FIG. 4, in accordance with certain example embodiments. As can be seen from the FIG. 5 example, the first metallic layer stack 19a includes first and second nickel-inclusive layers 25 and 27 sandwiching a silver-based layer 29. The nickel-inclusive layers 25, 27 may comprise, consist essentially of, or consist of metallic Ni, NiCr, NiTi, NiV, NiW, and/or the like. In certain example embodiments, the composition of the first and second nickel-inclusive layers 25 and 27 may be same. The amount of nickel in each of the first and second nickel-inclusive layers 25 and 27 preferably is at least about 60%, more preferably is at least about 70%, and still more preferably is at least about 80%. Example compositions include 80/20 and 90/10 NiCr, NiTi, and the like.

The thin-film layers shown in FIG. 5 may be formed via any suitable technique such as, for example, e-beam deposition, sputtering, and/or the like. For instance, a NiCr/Ag/NiCr layer stack may be formed via physical vapor deposition (PVD), e.g., in an inert atmosphere including nitrogen, argon, and/or the like. It also will be appreciated that this example layer stack may be formed using electrolytic techniques (e.g., similar to those used in mirror processes), selectively at the perimeter(s) of the substrates. The presence of Ni may in certain example embodiments help provide for good wettability, while also serving as a diffusion barrier (e.g., trapping Si, Na, and/or the like from the underlying substrate), and forming an extremely strong Ni-Silicide bond with the glass. It will be appreciated that other metallic layer stacks may be used in connection with different example embodiments, e.g., to match the content of the solder material, and may be applied via any suitable technique.

Layers 25 and 27 preferably have a thickness of 10 nm to 5 microns, more preferably 20 nm to 3 microns, and still more preferably 50 nm to 1 micron. Layer 29 preferably has a thickness of 10 nm to 2 microns, more preferably 50 nm to 1 micron, and still more preferably 100 nm to 500 nm or 1 micron. Example thicknesses for the layers in the NiCr/Ag/NiCr layer stack are 50 nm, 100 nm, and 50 nm, respectively.

Although layers 25 and 27 are described as being nickel-inclusive, it will be appreciated that copper may be used in place of, or together with nickel, in certain example embodiments. It has been found that both nickel-inclusive and copper-inclusive metallic layers adhere well to the glass and match well with a solder pre-form based on an alloy of tin, silver, and copper. Further details concerning the example solder pre-form of certain example embodiments are provided below. Although certain example embodiments are described in connection with wire pre-forms, it will be appreciated that other pre-forms (e.g., tape pre-forms) may be used in place of, or together with, such wire pre-forms.

Figure 6:
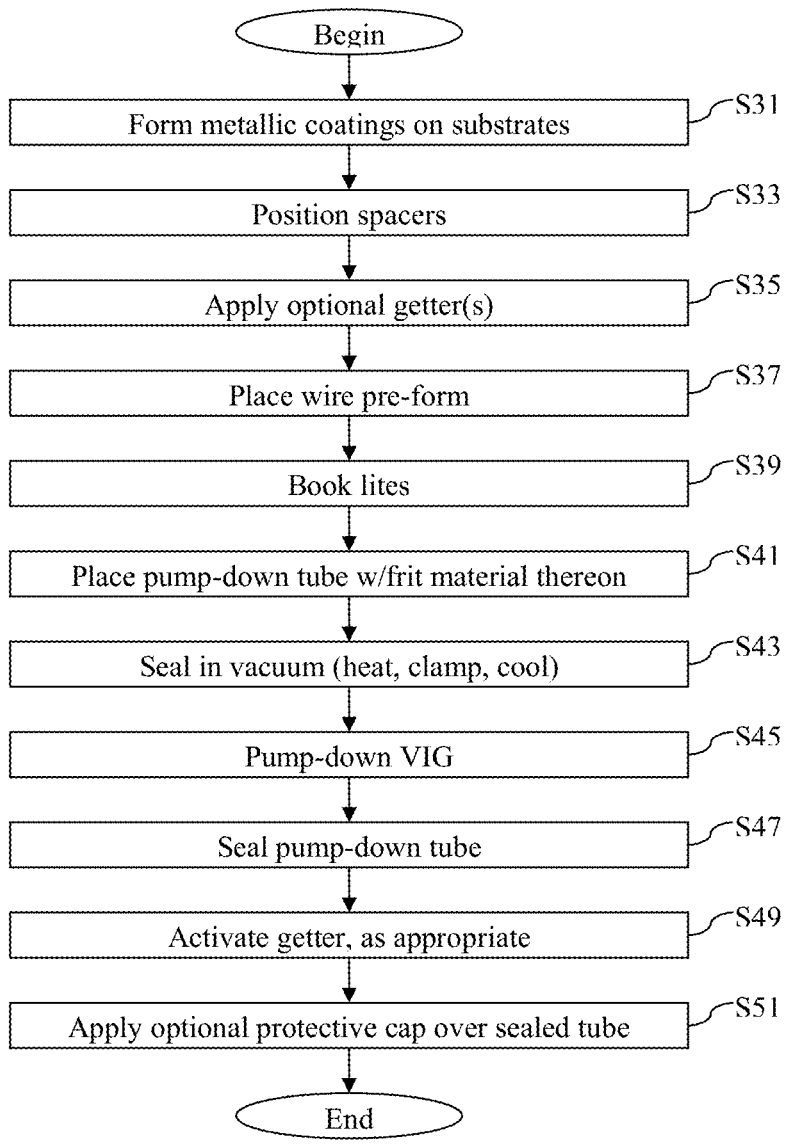
FIG. 6 is a flowchart illustrating a process for making a VIG unit in accordance with certain example embodiments.

FIG. 6 is a flowchart illustrating a process for making a VIG unit in accordance with certain example embodiments. It will be appreciated that one or more preparatory operations (not shown in FIG. 6) may be performed in certain example embodiments. For example, the substrates may be cut to size and/or edge seamed. A hole for accommodating the pump-out port, a getter-holding pocket, and/or the like, may be drilled. When glass substrates are used, the substrates may be heat treated (e.g., heat strengthened and/or thermally tempered), chemically tempered, etc. Heat treatment may be performed after sizing, drilling, and/or other operations. Thin film and/or other coatings may be formed on the substrates, as well. For instance, low emissivity (low-E), antireflective, and/or other coatings may be formed on the substrates. Decorative coatings may be screen printed, ink jet printed, and/or otherwise formed, in addition or as an alternative. In any event, if such coatings are heat treatable and the substrates are to be heat treated, they may be blanket coated on stock substrates prior to this heat treatment. If such coatings are not heat treatable and the substrates are to be heat treated, they may be formed on the sized and/or otherwise processed substrates. If the substrates will not be heat treated, the coatings may be formed at any suitable time, e.g., they may be blanket coated and/or applied to coatings after sizing and/or other operations. If a coating is, or coatings are, formed on the substrate(s), edge deletion may be performed, e.g., in the area proximate to where the edge seal is to be formed. The substrates may be cleaned (e.g., using DI water, plasma ashing, and/or the like). In certain example embodiments, pre-roughening of the glass and/or edge deletion in areas proximate to where the seal is to be formed is unnecessary.

Once the substrates are suitably prepared and properly oriented, a metallic coating (e.g., of the type shown in and described in connection with FIG. 5) may be formed around the peripheral edges of the substrates as shown in step S31 of FIG. 6. As indicated above, any suitable technique may be used to "nickelize" or otherwise treat the substrates. For instance, localized PVD may be used to create a three-layer thin film coating with a layer of or including Ag sandwiched between layers comprising Ni (e.g., NiCr), Cu, and/or the like. The coatings may be provided around the peripheral edges of the substrates at a width that is at least as wide as the solder when it is melted.

As indicated in step S33, spacers may be provided on the first substrate. The spacers may be substantially columnar pillars, cushion-shaped spacers, and/or the like. They may be glass pillars, formed from mica, a polymer, laminated pillars, and/or any other suitable material or material combination. The spacers disclosed in U.S. Pat. No. 6,946,171 and/or U.S. Pat. No. 8,679,271 may be used in these regards. The entire contents of each of these patent documents is hereby incorporated by reference herein. In this regard, because lower temperature processes are involved in the fabrication of the VIG unit, a potentially broader spectrum of materials for the spacers becomes available. Softer spacers will "dig into" the glass less than their harder counterparts, thereby producing less stress (e.g., based on Hertzian pressures) at such locations. As a result, it is possible to move the pillars or other structures farther apart. The ability to use different materials for the spacers and to locate them farther apart can advantageously improve the aesthetics of the unit and/or also potentially reduce thermal conductivity through the VIG unit.

Optionally, getter material(s) may be applied (e.g., in previously formed pockets, as blanket coatings, etc.). Getter materials and activation techniques are disclosed in, for example, U.S. Publication Nos. 2014/0037869, 2014/0034218, and 2014/0037870, the entire contents of each of which are hereby incorporated by reference herein. These and/or other getters may be used in connection with certain example embodiments. In certain example embodiments, a getter material including barium and/or zirconium, for example, may be blanket coated on a substrate, e.g., via e-beam evaporation and/or the like. Because the blanketed getter is provided over a large surface area, only a few angstroms of material may be needed to perform typical getter chemical getter functions. In certain example embodiments, the blanket may be less than 20 angstroms thick, more preferably less than 10 angstroms thick, and possibly 5 angstroms thick or even less. In this vein, the getter may be continuously or discontinuously on the substrate. Where blanketed getter is provided, it may be desirable to apply such materials prior the formation of the metallic coatings mentioned in connection with step S31.

In step S37, a wire pre-form or the like is provided around the peripheral edges of the substrate. In certain example embodiments, the wire pre-form may be bent into the desired configuration in one or more steps not shown. Alternatively, or in addition, the wire pre-form may be pieced together from multiple smaller sections. For instance, wires may be soldered end-to-end, laser-welded together, and/or the like.

As alluded to above, the solder pre-form may be an alloy of or including tin, silver, and copper. The solder pre-form preferably is lead-free. For instance, SAC305, SAC0307, and/or the like may be used in connection with certain example embodiments. SAC305 is a lead-free alloy that contains 96.5% tin, 3% silver, and 0.5% copper, and SAC0307 is a lead-free alloy that contains 99% tin, 0.3% silver, and 0.7% copper. In certain example embodiments, a solder paste of the same or similar composition may be provided in place of, or in addition to, a wire pre-form.

It is noted that lower-silver content SAC alloys such as, for example, SAC105, may be desirable in applications where shocks and vibrations are of concern. However, increasing the silver content can in some instances help to reduce the creep rate of SAC solders, thereby increasing reliability when subjected to temperature aging and/or the like. Thus, higher-silver content SAC alloys such as, for example, SAC405, may be desirable in high temperature applications. Alloys such as SAC305, SAC0307, etc., may be good "compromises" that provide desirable resistance to shocks and vibrations, while still providing good survivability for many high temperature related applications. It also is noted that other alloys in the phase space around and/or between these eutectic alloys may be used in different example embodiments.

The lites are booked together in step S39, and a pump-out tube with frit material thereon may be placed in a pre-drilled hole in step S41.

Optionally, a tape or other adhesive material may be used to help hold this subassembly together during further processing. Any polyimide, polyamide, acrylic, and/or other tape or adhesive material may be used to form a temporary seal. For instance, Kapton, Acrylite, and/or other tapes may be used in certain example embodiments.

Sealing may take place in vacuo, as indicated in step S43. The sealing may include, for example, heating to reflow the solder, the application of static pressure (e.g., via mechanical clamping and/or the like) during bond solidification, and a process in which the subassembly is cooled and/or allowed to cool. Dynamic pressure alternatively or additionally may be used in certain example embodiments. This initial vacuum preferably is less than 1 Torr, more preferably less than 0.5 Torr, and sometimes less than 0.1 Torr. It will be appreciated that an initial inert gas environment also may be used in connection with such operations in certain example embodiments.

Heating may be performed to a peak temperature sufficient to cause the solder to reflow but preferably does not exceed 390 degrees C., more preferably does not exceed 350 degrees C., still more preferably does not exceed 300 degrees C., and sometimes does not exceed 240-250 degrees C. In certain example embodiments, the peak temperature is just above the isopleth temperature of the solder. For instance, in certain example embodiments, the peak temperature preferably is less than 50 degrees C. above the isopleth temperature, more preferably 20-40 degrees C. above isopleth temperature. As an example, the peak temperature may be about 40 degrees above the isopleth temperature, which may correspond to about 240-250 degrees C. in some instances. The heating may be performed for several minutes to several hours. Preferably, the heating is performed for 1 minutes to 2 hours, more preferably 5-60 minutes, and sometimes from 10-30 minutes.

Figures 8A, 8B:
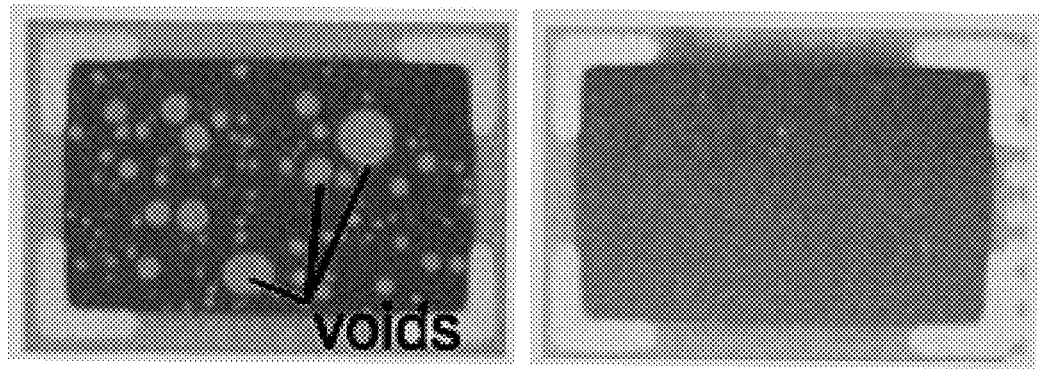
FIGS. 8*a*-8*b* are cross-sectional micrographs of an example SnAgCu metal seal structure.

Reflowing of the solder creates bubbles. The bubbles could become trapped in the edge seal and degrade the seal quality (e.g., by compromising its structural integrity and hermetic sealing properties) by, for example, leaving voids and/or the like in the fired seal. However, heating under vacuum conditions advantageously helps address these concerns. For example, heating under vacuum conditions in essence helps to suck the bubbles out during the reflowing process. In this regard, FIGS. 8a-8b are cross-sectional micrographs of an example SnAgCu metal seal structure. More particularly, FIG. 8a clearly shows the presence of voids after a partial vacuum of $10^{-2}$ Torr is reached. By contrast, FIG. 8b shows a lack of significant voids when the seal is completely formed and the VIG unit is under full vacuum. Although vacuum heating is preferable, an inert gas atmosphere can also be used during the reflow process.

A wire perform of about 1 mm in width expands (e.g., in some instances up to about 10 mm or sometimes even more). Nickel from the metallic coating diffuses into the solder, and vice versa. This reflowing process thus is reactive in certain example embodiments, in that several layers of materials that make up the hermetic seal are created, and these layers have been found to be very smooth. New phases of nickel are created. The bottom layer of material closest to the nickel in the metallic layer stack has been characterized generally as $(Ni_xCu_{1-x})_3Sn_4$, and the top layer closest to the reflowed SAC solder has been characterized generally as $(Cu_yNi_{1-y})_6Sn_5$. The IMC layers 21a and 21b in FIG. 4 may comprise at least these two layers in certain example embodiments. In certain example embodiments, the layer stack of or including glass/NiCr/Ag/NiCr/SnAg$_{3\%}$ Cu$_{0.5\%}$, e.g., as shown in and described in connection with FIG. 5, is transformed into a layer stack of or including glass/NiCrO$_x$:Si/(Ni$_x$Cu$_{1-x}$)$_3$Sn$_4$/(Cu$_y$Ni$_{1-y}$)$_6$Sn$_5$/SAC. In other words, in certain example embodiments, the first and second metallic layer stacks 19a and 19b may be transformed from a NiCr/Ag/NiCr layer stack into a layer of or including NiCrO$_x$:Si, with the Si being leached from the underlying substrate and/or the oxygen entering during the pump-down, for example. It will be appreciated that the seal in certain example embodiments provides an improved thermal break between the glass substrates and, as a result, advantageously results in reduced thermal conductivity.

Figure 7A:
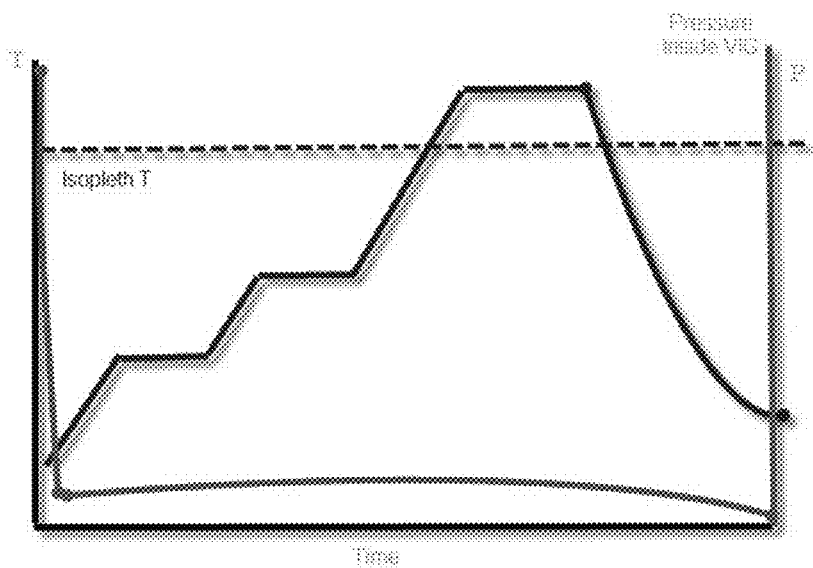
FIG. 7*a* is a graph showing an example temperature and pressure profile that may be used in connection with the pump-down of certain example embodiments.
Figure 7B:
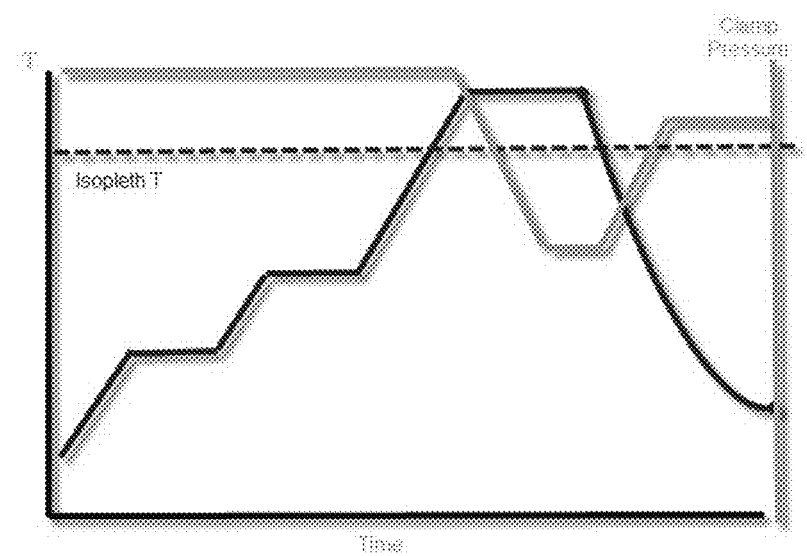
FIG. 7*b* is a graph showing example temperature and clamp pressure sequence curves that may be used in connection with certain example embodiments.

Pump-down may be performed in step S45, e.g., using the pump-down tube. The pressure within the cavity may be pumped down to $10^{-6}$ Torr in certain example embodiments. In other example embodiments, pump-down may be accomplished without using a tube. FIG. 7a is a graph showing an example temperature and pressure profile that may be used in connection with the pump-down of certain example embodiments. The pressure is measured inside the subassembly in the FIG. 7a example. As shown in FIG. 7a, the peak temperature is just above the isopleth temperature. The pressure may decrease quite rapidly but might in some instances thereafter experience a slow pressure increase and slow pressure decrease, e.g., as bubbles are formed and as outgassing takes place. In some instances, such a perturbation may develop and taper quite rapidly. It will be appreciated that other temperature and/or pressure profiles inside the subassembly may be used in connection with different example embodiments, and that that which is shown in FIG. 7a is just one example. FIG. 7b is a graph showing example temperature and clamp pressure sequence curves that may be used in connection with certain example embodiments. It will be appreciated that other temperature and/or clamp pressure profiles may be used in connection with different example embodiments.

If provided, the tube may be sealed in step S47. This may be performed using the pump-out tube tip-off techniques described in connection with U.S. Pat. No. 8,794,033; 8,742,287; and/or U.S. Publication No. 2014/0087099, the entire contents of each of which are hereby incorporated by reference herein.

If a getter is provided in a pocket, then the getter may be activated, as indicated in step S49. Additionally, or alternatively, if a getter is blanket coated on a substrate, the heat associated with the sealing may be sufficient to activate the getter.

It is noted that the cavity may be cleaned in connection with plasma-enhanced evacuation techniques and a static plasma grid or array, e.g., as set forth in U.S. Publication No. 2012/0304696, the entire contents of which are hereby incorporated by reference herein. Ozone cleaning techniques also may be used, e.g., as discussed in U.S. Publication No. 2013/0292000, the entire contents of which are hereby incorporated by reference herein.

The pump-out tube may have an optional protective cap applied over it, e.g., as noted in step S51. There are a variety of techniques that may be used to protect the pump-out tube and that may be used in connection with certain example embodiments. See, for example, U.S. Pat. No. 8,833,105 and U.S. Publication Nos. 2013/0074445, 2013/0302542, 2013/0306222, and 2013/0309425, the entire contents of each of which are hereby incorporated by reference herein.

In certain example embodiments, an optional secondary, non-hermetic peripheral seal may be provided. The seal may be a peripheral polymeric seal in certain example embodiments, and it may, for example, comprise silicone, polyamide, PIB, and/or the like. It may in some instances help to protect the hermetic edge seal that it at least partially encapsulates.

When tempered glass is used, preferably at least 70% of temper strength remains in the finished VIG unit, more preferably at least 75% of temper strength remains in the finished VIG unit, still more preferably at least 85% of temper strength remains in the finished VIG unit, and still more preferably at least 95% of temper strength remains in the finished VIG unit.

Figure 9:
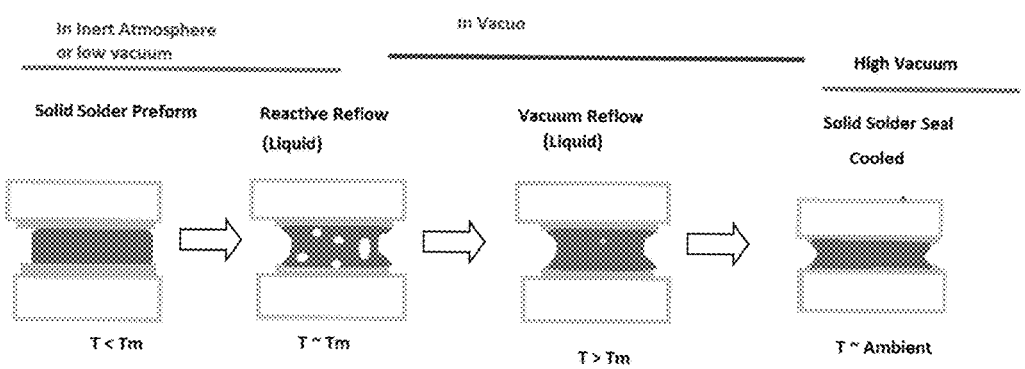
FIG. 9 is a schematic diagram illustrating an example solder seal formation process that may take place in certain example embodiments.

FIG. 9 is a schematic diagram illustrating an example solder seal formation process that may take place in certain example embodiments. As shown in FIG. 9, the subassembly with the solid solder pre-form sandwiched between the thin film coatings supported by the opposing first and second substrates is inserted into an inert atmosphere and/or low vacuum environment. Because the temperature of the solder pre-form is less than the melting temperature, the solder pre-form is sold. However, as the temperature is increased and the temperature is at about the melting temperature of the solder pre-form, reactive reflow begins. Voids, bubbles, etc., form in the now liquid or liqidous solder, and the thin film coatings begin to dissolve into the solder, and vice versa. The subassembly is moved into vacuum conditions and the temperature exceeds the melting temperature of the solder. The bubbles in the liquid solder are in large part removed from the solder, e.g., in the vacuum reflow operation. Diffusion of the thin film coatings into the solder, and vice versa, continues. The thin film coatings may also at least partially dissolve into the substrate, and/or vice versa. The solder is cooled and/or allowed to cool at high vacuum, and the temperature is returned to ambient, completing formation of the hermetic seal. It will of course be appreciated that static and/or dynamic pressure applications are not shown in FIG. 9 but may be used in this example process. It also will be appreciated that this is one schematic view of how the sealing operations may take place, and other processing flows may be used in place of, or together with, those shown in the FIG. 9 example.

It will be appreciated from the above that certain example embodiments involve coating the surface of the glass with a metallic layer stack (MLS). The solder joint creation technique of certain example embodiments involves inter-metallic reactions at the surface of the MLS and the solder bulk in order to establish a strong bond, and forming a thin inter-metallic layer during solder reflow. This inter-metallic layer is stronger but more brittle than the bulk solder. Therefore, the increasing thickness of the interfacial IMC layer too far can be deemed detrimental to reliability under mechanical stresses. It has been observed that diffusion, occurring more rapidly at higher temperatures, can cause the interfacial inter-metallic layers at the interfaces to grow more quickly as a function of time. However, the reliability of solders at elevated temperatures may in some instances be increased by suppressing the growth of the inter-metallic layer at the underlying metallic layer stack interface. The paragraphs that follow help characterize IMC layer growth and discuss factors that can be used to tune IMC layer growth, etc., to result in high quality seals in certain example instances.

The thickness of the IMC layer may depend on factors, such as, for example, temperature, time, volume of solder, property of the solder alloy, morphology of the deposit, etc. And as noted above, inter-metallic layers grow as a function of time and also tend to grow faster at elevated temperatures. Holding the peak temperature during reflow for longer durations can increase the initial inter-metallic layer thickness and change its morphology. Therefore, shorter peak temperatures may be advantageous in certain instances.

Inter-metallic layers may grow failure locations that can move into interfacial inter-metallic layers, which can in some instances be attributed to the weaker interfaces between inter-metallic layers and bulk solder, as well as the high modulus of elasticity of inter-metallic compounds increasing the stress in those layers. The presence of voids that occur as a result of diffusion of Sn away from the interface during aging at high temperatures can reduce the strength of the bond. Silver related inter-metallic layers, e.g., $Ag_3Sn$, can form in the bulk solder and can migrate towards interfaces over time. Increasing the concentration of silver within the solder alloys can create larger $Ag_3Sn$ platelets and large needles in the bulk solder that tend to be brittle and can initiate fractures. Thus, the amount of silver can be tuned to provide better long-term seals. In some instances, solder joints with less than 3.5 wt. % silver may reduce the formation of large $Ag_3Sn$ inter-metallic layers. In some instances, a solder alloy composition with less than 1.2 wt. % silver can be advantageous in terms of seal quality.

It also is believed that the inter-metallic growth rate for solid-liquid couples is significantly faster compared with growth rate for solid-solid couples. Thus, it may be advantageous to use solid pre-forms, e.g., as described above. Other properties, such as inter-metallic layer roughness, can have an effect on the seal quality. For instance, as inter-metallic layers increase in thickness, the roughness also tends to increase, which can cause cleaving failures in some instances. It has been found that if the surface finish roughness can be reduced, less brittle forms of the inter-metallic layers can be formed.

In certain example embodiments, the introduction of a small amount of nickel to lead-free solder perform including Sn and Cu can improve fluidity. Ni can be used to create disturbances in the crystal structure and can facilitate earlier nucleation of the inter-metallic phase during soldering. This could in turn help provide better fluidity and bright solder fillets. Nickel modified SnCu, etc., also may reduce interfacial inter-metallic growth. Doping with trace amounts of rare earth elements also may be useful in these and/or other regards. Cobalt, nickel, antimony, and/or the like, may for example result in a thick initial inter-metallic layer after reflow that acts as a diffusion barrier but that retards subsequent growth of the inter-metallic layer.

Although certain example embodiments have been described in connection with SAC-related alloys, it will be appreciated that Zintl materials may be used. Zintl materials include Group 1 (alkali metals) or Group 2 (alkaline earths) and, post-transition metals or metalloids from Group 13, 14, 15, or 16. Moreover, certain example embodiments may include any suitable alloy based on tin including a Zintl material and/or anion. Similarly, although certain example embodiments have been described in connection with SAC-related alloys, it will be appreciated that other metal alloys based on post-transition metals or metalloids from Group 13, 14, 15, or 16 and transition elements may also be used. For instance, certain example embodiments may include a metallic alloy pre-form based on inter-metallics of Sn and one or more additional materials selected from post-transition metals or metalloids; Zintl anions (e.g., In, Bi, etc.) from group 13, 14, 15, or 16; and transition metals (e.g., Cu, Ag, Ni, etc.); and excludes Pb. This may include other materials such as, for example, In, In and Ag, Bi and In, etc. In general, any Indalloy alloy material (e.g., available form the Indium Corporation) may be used in connection with certain example embodiments, and those that lack lead may be preferred for at least the reasons provided above. In certain example embodiments, other materials that are not Sn-based (e.g., that are based on some other metallic material) may be used.

As will be appreciated from the above, a fully tempered VIG unit may be fabricated using a metal seal based on the formation of a hermetic solder/metal layer/glass joint. The quality, and indeed the existence, of the hermetic seal in some instances can be highly dependent on a metallic layer pre-coated on the periphery of the glass. The film stack as a whole may be formed using an MSVD process, which can help provide for a stack that: (i) has ultra-low porosity and high density approaching that of bulk material, (ii) is highly adherent to the glass, (iii) includes low to virtually no stress, and (iv) has a high energy release rate threshold.

The MSVD process is advantageous in certain instances because it can provide the above-described stack with the above-listed properties. It nonetheless would be desirable to increase the deposition rate and/or otherwise streamline the deposition process. For example, because the hermetic seal is to be provided only around the peripheral edges of the substrate(s), a deposition mask may be needed so that the center of the glass remains uncoated. This masking process unfortunately remains cumbersome, e.g., as the mask must be deposited and removed, which could require many deposition, cleaning, and/or other steps, that slow down the process as a whole. Indeed, it would be desirable to achieve "in-line" processing speeds, e.g., such that there is a "lineal scan" of about 1 m per second.

Thus, certain example embodiments implement alternative deposition processes to allow for the formation of a metallic stack on selective areas of the glass. In this regard, certain example embodiments provide for selective metal surfacing of glass by means of activated energetic spray deposition, or activated energetic nano-spray deposition. More particularly, certain example embodiments implement a high velocity wire combustion (HVWC) technique or a high velocity oxy-fuel (HVOF) technique. Although wire flame spraying is a relatively old thermal spray process, modern equipment permits production of high quality coatings featuring outstanding homogeneity, high density, and low roughness, e.g., due to increased particle velocities as a result of increased combustion gas velocity. Spray particles may, for example, be accelerated to velocities exceeding 250 m/s, e.g., if the wires are atomized adequately, in connection with an HVWC technique. For HVOF, the velocity of the particles hitting the substrates preferably is greater than the speed of sound, more preferably above Mach 2, and still more preferably at Mach 4 or above. The combustion wire thermal spray process of certain example embodiments basically involves the spraying of molten metal onto a surface to provide a coating. Material in wire form is continuously fed in a very hot combustion zone cavity and melted in a flame (e.g., an oxy-acetylene flame, a hydrogen and oxygen mixture that provides a reducing atmosphere, and/or the like) and atomized using compressed air or nitrogen to form a fine spray. For both HVWC and HVOF techniques, metals and/or alloys in wire form may be used as its spraying materials, and a combustion flame or electric arc may be used as its heat source. As explained in greater detail below, Ni, NiCr, Ag, and/or other wires may be used to form the metallic coatings of certain example embodiments.

Compressed air and/or inert gas surrounds the flame and atomizes the molten tip of the wire in HVWC and HVOF techniques. This helps in accelerating the spray of molten particles towards a pre-cleaned surface of the substrate, which may be located about 12-14 inches away from the end of the flame in certain example embodiments. In terms of accelerating the spray, process gases may include helium, nitrogen, argon, oxygen, and/or the like. Nitrogen may be advantageous when it comes to depositing metals, as nitrogen typically helps prevent oxidation and is less expensive than helium. However, another gas may be used for depositing silver and/or NiCr, as nitrogen gas typically promotes the formation of a nitride. Helium has been found to be a good operating gas in terms of producing high quality coatings in the context of the efficient processes. This is conjectured to be the result of the helium being able to attain the highest gas velocity. The deposition may be performed in a helium-inclusive atmosphere that allows for the recycling of the gas, e.g., to promote cost savings.

In HVWC and HVOF techniques, when the spray contacts the prepared surface of the substrate, the fine molten droplets rapidly solidify, forming a coating. Because solidification occurs rapidly, the as-sprayed deposit is ultra-fine grained. The substrate may be heated to a base temperature of between 80-150 degrees C., in certain example embodiments. Preferably the temperature is below 390 degrees C., more preferably below 300 degrees C., and in some cases the temperature may be 100 degrees C. or lower. In some instances, higher temperatures in these and/or other ranges might be desirable, e.g., in terms of aiding in degasing the surface of the substrate and/or removing water that is physisorbed and/or chemisorbed in the substrate; however, temperatures that are too high could cause unwanted de-tempering of tempered glass substrates, melting or bowing, etc., so care should be taken in regard to temperature and/or temperature profile selection. This temperature range allows the metal spray droplets to wet after reaching the surface. Moreover, the particles that impact the substrate above a threshold (critical) velocity for the powder and substrate combination to deform and bond in a dense layer. As the process continues, particles continue to impact the substrate and form bonds with the previously deposited material, resulting in a uniform deposition with very little porosity and a high bond strength. Advantageously, these temperature ranges help avoid metal oxidation, do not cause significant de-tempering, etc.

In a similar vein, as will be appreciated from the more detailed description that follows, such techniques advantageously permit the deposition of large variety of metals as well as stacks of metals directly onto glass at temperatures that will not be detrimental to glass integrity and strength. For instance, with respect to the atomized material generated from the feedstock, the temperature of the powder-laden gas jet and the temperature of the powder material preferably are sufficiently low to prevent a phase change, and significant stress from accumulating, in the deposit and/or substrate. By changing the feed rate of raw materials, gas flow speed, and/or the like, the properties of the films can be modified so as to form graded layers. The presence of graded layers may be advantageous when it comes to the reflow of solders, as the presence of pores can help localize the extent of the reflow and thus assist in localized wetting of solder.

In HVWC and HVOF techniques, the particles that impact the glass and form the coating may be in the form of a nano-metric powder, e.g., with a particle size distribution less than 500 nm in diameter or major distance, more preferably less than 250 nm, and still more preferably less than 100 nm. In certain example embodiments, particles with a sub-micron size distribution possibly as low as 40-100 nm in diameter or major distance may be used to form the coating.

For HVOF techniques, metal powders may be used instead of or in addition to wire feedstock. For instance, the metal powders initially may range in particle size such that their diameters or major distances range from 10 nm to less than 10 microns, more preferably 25 nm to one micron or less, and sometimes 40 or 50 nm to 0.5 microns. A plasma jet in an inert atmosphere may be used to spray these particles onto the substrate at a high velocity in certain example embodiments. In certain example embodiments, these powders may be accelerated by injection into a high-velocity stream of an inert gas. In this latter case, a high velocity gas stream may be generated through the expansion of a pressurized, preheated gas through a nozzle. The pressurized gas may be expanded in order to achieve high velocity, with an accompanying decrease in pressure and temperature. The powder particles, initially carried by a separate gas stream, may be injected into the nozzle either at the nozzle entrance or at a lower pressure point downstream of the entrance. The particles may be accelerated by the main nozzle gas flow and can impact the substrate surface after exiting the nozzle.

In HVOF and HVWC techniques, in order to help ensure that particles of a maximum desired size are emitted towards the substrate, a filter may be used. A filter may be used to help ensure that more homogenously sized particles are allowed to condense on the surface of the glass. An electromagnetic filter or the like may be used in this regard if the particles are charged intentionally or as a result of the deposition technique that is used. For example, the electromagnetic filter may aid in vaporizing material and/or re-vaporizing larger nanoparticles that exceed a certain size threshold. An electromagnetic filter also may be advantageous in that it may help to at least partially ionize particles, which allows them to better adhere to the surface of the substrate. A strong magnetic field may be used for these purposes. For instance, it would be desired to use a magnetic field of at least 5 milliTesla, that is as high as perhaps hundreds of milliTesla (i.e., less than 1000 milliTesla).

The HVWC and HVOF flame spray processes of certain example embodiments may be carried out with the substrate standing vertically in certain example embodiments. For example, certain example embodiments may use a gun-like nozzle or the like, which can traverse the substrates in a motion that can be automated via an XY plotter platform, robot arm, or the like. A nozzle shroud with a variable aperture may be used, with the nozzle shroud allowing the coating to be selectively deposited on a variably sizable desired area. In certain example embodiments, a baffle may be used inside of the apparatus to help trap reflected particulate matter.

Figure 10:
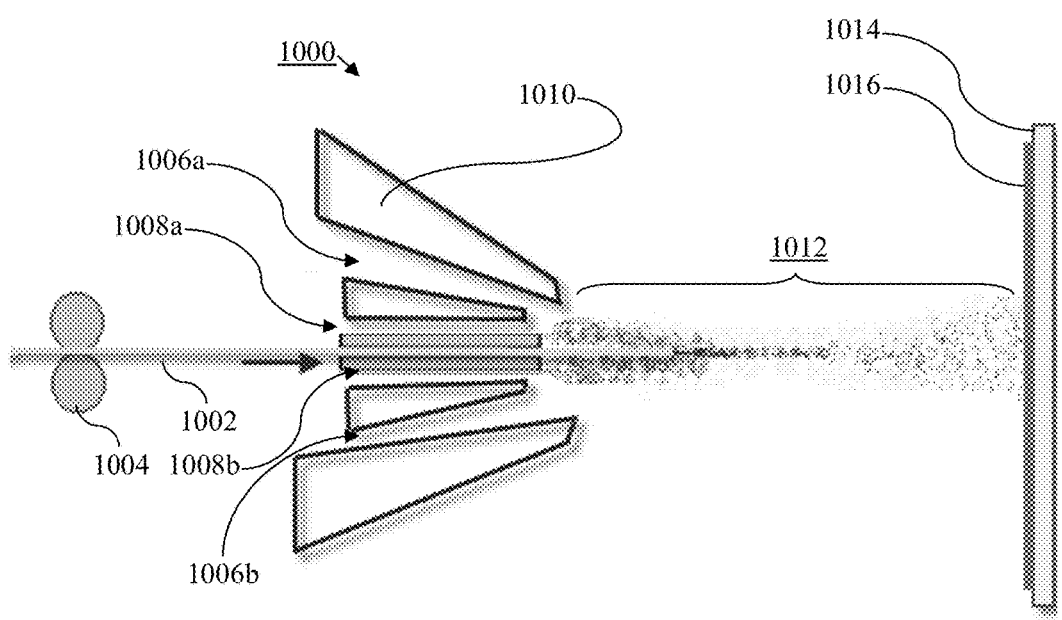
FIG. 10 is a schematic view of an example high velocity wire combustion (HVWC) apparatus 1000 that may be used in connection with certain example embodiments.
Figure 11:
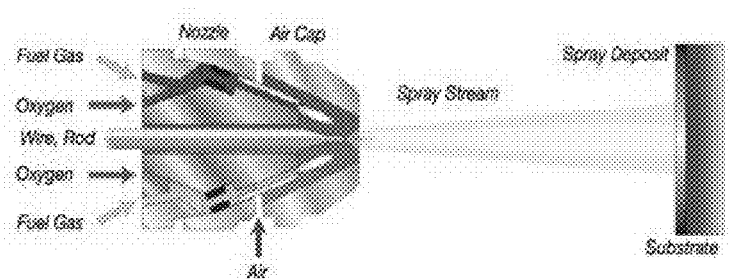
FIG. 11 is an example enlarged tip portion of an example HVWC apparatus provided by Oerlikon Metco, which may be used in connection with certain example embodiments.
Figure 12:
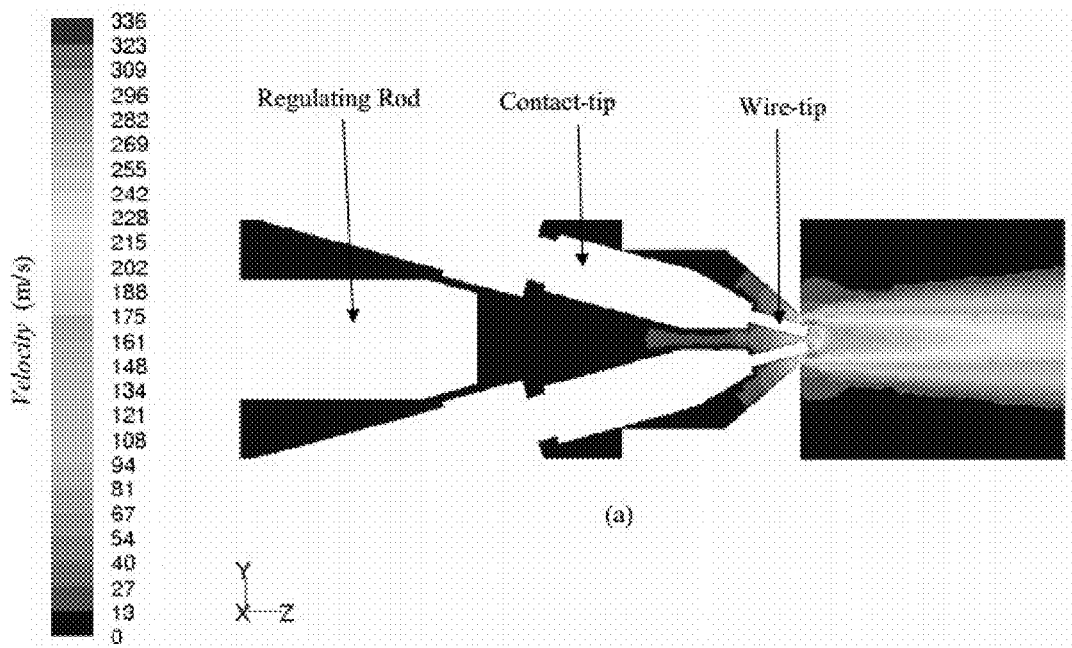
FIG. 12 is a simulated schematic view showing the velocity to which the molten powders produced from the wire feed is accelerated, e.g., as it exits the apparatus of FIG. 10 through the tip and towards the substrate.

FIG. 10 is a schematic view of an example HVWC apparatus 1000 that may be used in connection with certain example embodiments. As will be appreciated from FIG. 10, the apparatus 1000 receives wire 1002 from a wire source 1004 into a body portion. A first set of inlets 1006a and 1006b accommodate carrier gas, and a second set of inlets 1008a and 1008b accommodate an oxygen and fuel gas mixture. A shield 1010 helps contain the apparatus 1000, provide cooling, reduce the incidence of spraying in unwanted directions, etc. The molten particles 1012 are accelerated towards the substrate and form 1014 and form a coating 1016 thereon. FIG. 11 is an example enlarged tip portion of an example HVWC apparatus provided by Oerlikon Metco, which may be used in connection with certain example embodiments. In this regard, a MultiCoat™ Advanced Automated Wire Combustion Spray system from Oerlikon Metco also may be used in certain example embodiments. FIG. 12 is a simulated schematic view showing the velocity to which the molten powders produced from the wire feed is accelerated, e.g., as it exits the apparatus of FIG. 10 through the tip and towards the substrate.

In HVWC and HVOF techniques, molten materials are sprayed onto the surface of the subject to form a continuous pinhole free coating. The glass substrates being sprayed is exposed to the plume of hot metallic particles. As alluded to above, the substrate and the deposit are not adversely affected by high temperatures. This advantageously helps to provide dimensional and morphological stability, causing no or few cracks, no adhesion strength reduction, and/or the like.

HVOF and HVWC techniques advantageously can be used to create layer stacks with the individual layers and the layer stack as a whole having desirable thickness uniformity, porosity, and other characteristics. Because the layers formed in such manners are dense and strong, it is possible to use a bilayer stack for metallizing the perimeter for the edge seal in certain example embodiments. The bilayer stack may be selectively deposited at atmospheric conditions (e.g., in a reducing atmosphere) and yet be highly adherent to glass, dense, and have a low oxidic content. When a solder preform of the type disclosed herein is reflowed between two such coatings on adjacent glass substrates, a hermetic seal can be formed either at ambient or vacuum conditions. In certain example embodiments, the bilayer coating can be buffed or burnished using an ultrafine carbide surface abrader so as to remove unwanted oxidic scale (e.g., in the upper layer) prior to forming the IMC.

The bilayer stack of certain example embodiments comprises a nickel-inclusive layer formed directly or indirectly on the substrate. The nickel-inclusive layer may comprise, consist essentially of, or consist of metallic Ni, NiCr, NiTi, NiV, NiW, and/or the like. A silver-inclusive layer may be provided over and contacting the nickel-inclusive layer. These layers may be formed by HVWC or HVOF techniques, e.g., so that they are selectively deposited to metallize the peripheral edges of the substrates. Any combination of HVWC and HVOF techniques may be used to form these layers (e.g., HVOF or HVWC techniques may be used to deposit both layers, an HVOF technique may be used to deposit one layer and an HVOF technique may be used to deposit the other layer, etc.).

As indicated above, an optional burnishing process may be used to remove oxidic scale from the bilayer stack in certain example embodiments. The oxide and/or nitride content of the layers and/or the stack as a whole preferably is less than 10 wt. % or at. %, more preferably less than 5 wt. % or at. %, and still more preferably less than 1 or 2 wt. % or at. %. The coating also is preferably free from or at least substantially free from carbon. This may be a concern, e.g., when a combustion gas is used in connection with an HVOF technique. Preferably, carbon content is less 2% wt. %, more preferably less than 1 wt. %, and sometimes less than 0.5 wt. %, for the individual layers and/or the layer stack as a whole (e.g., after optional burnishing).

The thickness of the nickel-inclusive layer preferably is 5-20 microns, more preferably 10-20 microns, and an example nominal thickness is 15 microns. The thickness of the silver-inclusive layer preferably is 15-25 microns, and an example nominal thickness is 25 microns. Thus, the full bilayer stack may have a thickness of 20-45 microns, with an example nominal thickness of 35 microns. The thickness of each of the nickel- and silver-inclusive layers preferably varies by no more than 15%, more preferably no more than 10%, and sometimes no more than 5%. The thickness of the full bilayer stack preferably varies by no more than 40%, more preferably no more than 30%.

The RMS roughness (Ra) of the nickel-inclusive layer preferably is less than 2 microns and more preferably less than 1 micron. The RMS roughness (Ra) of the silver-inclusive layer preferably is less than 2 microns, more preferably less than 1 micron, and still more preferably less than 0.5 microns. After burnishing, the bilayer stack preferably has an RMS roughness (Ra) of less than 2 microns and more preferably less than 1 micron. HVWC techniques may provide for better (i.e., lower) RMS roughness (Ra) values in some instances.

In certain example embodiments, a metallic solder paste may be used to "fill in" peaks and valleys that drive the surface roughness above a desired level. The paste may have the same composition or similar composition of the solder being used. Alternatively, or in addition, solder can be melted to the surface of the coating prior to formation of the IMC, e.g., to help ensure that the solder has filled in any pores that are potential leak paths and can be plugged using this technique.

Porosity of each of the layers, and the layer stack as a whole, preferably is less than 10%, more preferably less than 5%, and sometimes less than 2%, e.g., in terms of vol. %. HVWC techniques may provide for better (i.e., lower) porosity values in some instances.

Adhesion or bond strength for the individual layers and the layer stack as a whole may be in the 2-50 MPa range in some instances. For instance, it is possible to form nickel- and silver-inclusive layer with an adhesion or bond strength of 10 MPa, and it is possible to form a bilayer stack with an adhesion or bond strength 20 MPa. In some instances, the bond strength may be higher when HVOF techniques are used. The bonding is preferably strong enough so that the failure mode involves breakage of the glass as opposed to, for example, breaking of the seal.

It has been found that the nickel-inclusive layer provided at the bottom of the bilayer stack is good for adhesion, especially when formed on the air side of the glass. That is, the nickel-inclusive layer forms a silicide with the glass, which promotes adhesion. If the nickel-inclusive layer is formed on the tin side of the glass, adhesion may not be as good because the presence of the "extra tin" might hamper the formation of the silicides that promote adhesion. Thus, certain example embodiments may form a silicon-inclusive layer on the tin side of the substrate prior to deposition of the bilayer stack, if the tin side of the glass is to be coated. The silicon-inclusive layer may be blanked coated on the substrate (e.g., via sputtering or the like), or it may be otherwise formed on the substrate at least in those areas where metallization is to occur. The silicon-inclusive layer may be a layer of or including silicon oxide, silicon nitride, silicon oxinitride, and/or the like. Localized ion beam cleaning can be used in place of, or in addition to, the formation of this optional silicon-inclusive layer, e.g., to help pre-treat the tin side surface of the glass.

As alluded to above, the HVWC technique may accept wire feeds of Ni, NiCr, Ag, and/or the like. The gas may include hydrogen and/or oxygen in a hydrogen-to-oxygen ratio ranging from 1:1 to 2:1 or even higher, e.g., with an example ratio of 1.2:1. The flame temperature may operate in the 2800-3500 degree C. range, with an example operating temperature of about 3300 degrees C. The particle velocity preferably is at least 150 m/s, more preferably at least about 200 or 250 m/s. Particle velocity may be accelerated to 400 m/s or even higher in some instances. These process conditions advantageously can result in a dynamic deposition rate ranging (DDR) from 10 g/min to 1000 g/min (with an example DDR being 100 g/min) in some instances.

Figure 13:
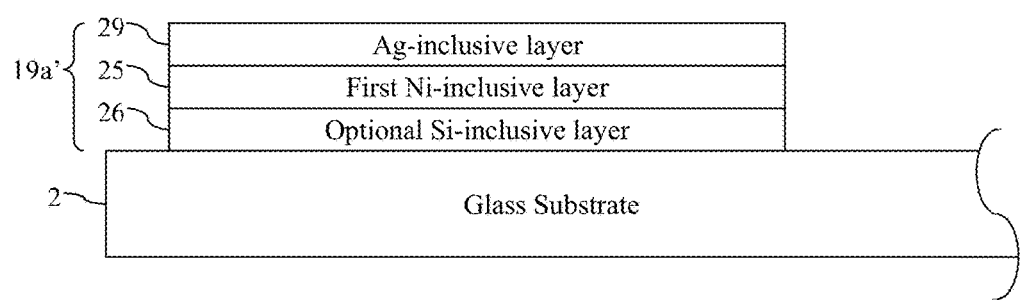
FIG. 13 is an enlarged view of a metallic layer stack formed on the first substrate, which may be used in the FIGS. 3 and 4 examples, in accordance with certain example embodiments.

FIG. 13 is an enlarged view of a metallic layer stack formed on the first substrate, which may be used in the FIGS. 3 and 4 examples, in accordance with certain example embodiments. In that regard, FIG. 13 is similar to FIG. 5, in that it shows a metallic layer stack 19a' that may be used in connection with an improved edge seal (e.g., 15 in FIGS. 3-4). Unlike FIG. 5, however, the metallic layer stack 19a' of FIG. 13 lacks a nickel-inclusive layer provided over the Ag-inclusive layer 29. Instead, the first nickel-inclusive layer 25 is provided directly or indirectly on a surface of the substrate 2, and the Ag-inclusive layer 29 is provided over and contacting the first nickel-inclusive layer 25. As will be appreciated from FIG. 13, an optional Si-inclusive layer 26 is provided to promote adhesion between the first nickel-inclusive layer 25 and the surface of the substrate 2 (e.g., when the metallic layer stack 19a' is provided on the tin side of the substrate 2). This Si-inclusive layer 26 is optional and may not be needed, for example, if the first nickel-inclusive layer 25 is provided directly on the air side of the glass.

Although shown only on the first substrate 2, it will be appreciated that this layer stack 19a' may be used on both substrates. The solder preform may be placed on the layer stack 19a', and an IMC may be formed as described above.

Figure 14:
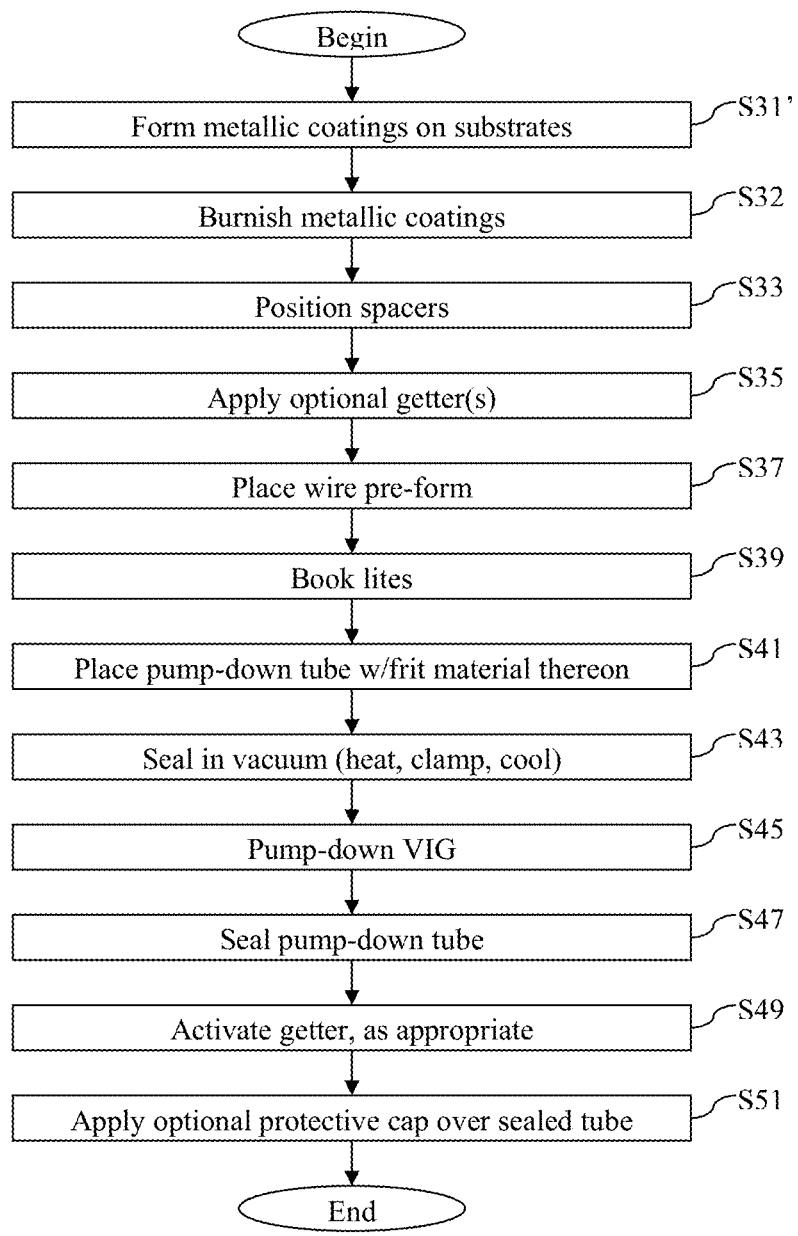
FIG. 14 is another flowchart illustrating a process for making a VIG unit in accordance with certain example embodiments.

FIG. 14 is another flowchart illustrating a process for making a VIG unit in accordance with certain example embodiments. FIG. 14 is similar to FIG. 6. FIG. 14 differs, however, in that the metallic coating of FIG. 13 is formed on the substrates in step S31' (e.g., using an HVOF or HVWC technique), and the formed coatings are optionally burnished in step S32. As indicated above, the coatings may be formed in atmosphere and/or a partially reducing atmosphere. The metallic coatings have desired porosity, thickness uniformity, and adhesion strength, e.g., as a result of the HVOF or HVWC technique used to form them.

In certain example embodiments, the HVOF/HVWC deposition may occur immediately after (e.g., within seconds or minutes and possibly no more than 1 hour, more preferably no more than 30 minutes, and still more preferably no more than 15 minutes of when) the substrates for the VIG have been cooled down to temperatures below 390 degrees C. For instance, as noted above, this advantageously helps reduce the risk of water being re-adsorbed back onto and into the glass. In this regard, two well thermally de-gassed glass substrates generally will provide a better vacuum over a longer term. In principle, this approach may help to produce a VIG with less outgassing over time (e.g., with all other factors being equal).

Although certain example embodiments are described in connection with SAC alloys, certain example embodiments may use InAg solder alloy pre-forms and/or the like. An InAg material may facilitate the formation of different but still beneficial IMCs that provide the desired level of hermeticity for edge seals, in certain example embodiments.

It will be appreciated that the techniques described herein may be used to seal pump-out holes in place of, or in addition to, the edges of VIGs. For instance, certain example embodiments may use techniques similar to those described above to fabricate a rugged, tube-less seal around a pump-out hole at temperatures lower than 300 degrees C. and, more preferably, lower than 180 degrees C. Because temperatures are lower than 350 degrees C., it becomes possible to use heat treated (e.g., thermally tempered) substrates and de-tempering preferably does not occur. Units have been made that pass fine leak test and have recorded leak rates less than $10^{-13}$ atm cc/s after exposure to ambient. The sealing of the pump-out tube preferably is hermetic and reliable for relatively long periods of time (e.g., 20 or more years). A secondary polymer seal may be used to aid in longevity.

Certain example embodiments achieve a ruggedized hermetic seal using a metal solder (e.g., of or including indium and indium silver alloys, SAC, Sn—Pb, SnBiAg, SATi, SATiRE, and/or the like) under thermo-compressive conditions. As noted above, the technique is based on locally modifying the glass surface around the pump-out hole with a highly adherent metallic coating that selectively changes the surface energy and thus wettability of the glass with respect to the metal solder used, e.g., similar to the techniques disclosed above. The large contrast in solder contact angle between uncoated (θs=θint) and coated (θs=θext) regions helps confine the liquid solder to the more wettable regions. This effect is also accentuated in some instances by the reactive reflow process, whereby the solder diffuses into the metallic coating to form an IMC.

In certain example embodiments, the peripheral seal between two glass sheets may be formed using low-temperature glass solder or metal solder systems, followed by pumping down, gas purge, plasma scrubbing, and final evacuation. Sealing of the VIG may then be performed on the localized tip-off seal at a reflow temperature of 160 degrees C. or lower. This sequencing, which may involve two different temperatures in some instances, advantageously simplifies the manufacturing and allows the peripheral seal to be first completed at ambient pressures (albeit in vacuum or reduced oxygen or inert atmosphere), while the tip-off cover seal can be performed under high vacuum. In certain example embodiments, e.g., where the edge seal and pump-out hole are formed using metal seals, different reflow processes and/or process temperatures may be used for the different seals. It will be appreciated that the two-step process may allow for helium leak checking of the peripheral seal prior to the formation of the tip-off seal. It is also possible to use the same solder and complete both peripheral and tip-off seals near-simultaneously, e.g., under high vacuum.

The tip-off seal may be formed via either a metal rivet-like plug within a metallized pump hole, by adjoining a metallized cover plate (or metallic sheet, stainless steel, Ni, Cu, and/or the like) to the pump-out area of the VIG, etc. Certain example embodiments may use a flat glass cover, a metallized or metal cover, and/or a secondary metal solder.

Advantageously, these example approaches are compatible with lamination process and thus allow the VIG to be laminable from either side of the unit.

Certain example embodiments form a "true seal" rather than simply using a "gasket." In this regard, a true seal forms a chemical bond at the mating surfaces, whereas a gasket forms only a vacuum-tight barrier. The chemical bond associated with a true seal can be achieved by a reaction occurring between the metal solder preform and a metallized glass surface (or thin metal sheet) to produce an alloy layer or intermetallic layer or compound (IML), and/or by means of an oxide bond. It is believed that an oxidic bond may occur because of the very rapid oxidation tendency of the soft metals when fresh, un-oxidized surfaces of the metals come into contact with oxides such as those in glass and ceramics. Certain example embodiments incorporate seals of the former type, which have found to be stable in maintaining hermeticity over long periods of time. In this regard, seals of the former type are formed, with the risk of forming of an unwanted oxide being reduced by processing in vacuum or inert or low partial pressure oxygen environment, and/or providing a way to getter the oxides. Certain example embodiments involve processing at ambient atmospheres, but a class of scavenger elements that are able to remove tenuous oxides may be used, e.g., as described below.

Advantageously, certain example embodiments are able to avoid the formation of solidification defects in order to achieve a stable and reliable joint/seal. In this regard, certain example embodiments advantageously help reduce the likelihood of defects such as, for example, lift-off, cavity shrinkage, rough dendritic surface, void, and/or other defects. Such defects may be caused by a variety of factors such as, for example, localized delay in solidification, under-cooling, micro-phase segregation, evolution of gases, solidification shrinkage, etc. These defects have in turn been attributed to the poor compatibility between solder and plating materials and the thermal mismatch between the solder and the other materials such as glass. However, certain example embodiments make use of compatible materials that aid in forming a hermetic seal on the scale of a VIG. Furthermore, long, finger-like solidified solder patches also can be seen near the periphery of some fabricated metal seal VIGs, and these defects are caused by molten solder that has flowed towards and solidified on the inner glass areas. Again, certain example embodiments are able to reduce the likelihood of such defects occurring in a VIG.

In certain example embodiments, a uniform and air tight gap is kept as the solder preform is being sandwiched between the glass sheets prior to reflow. The initial thickness or height of the preform was calculated (based on several factors including cost, initial stiffness, reflow parameters, viscosity, wettability, conservation of mass, etc.) and found to be optimum at around 600-700 microns at a minimum width of about 4 mm. The final reflow then provides a solder thickness of 300 microns with a width in the order of 10 mm on average. At these dimensions, the stiffness of the solder preform is low enough so as to be compliant and acts as a gasket seal during fabrication. This serves two purposes, namely, helping to prevent the solder from oxidizing in ambient processing, and keeping a uniform gap between the substrates. The latter may be useful during reflow, e.g., as discussed below.

Figure 15:
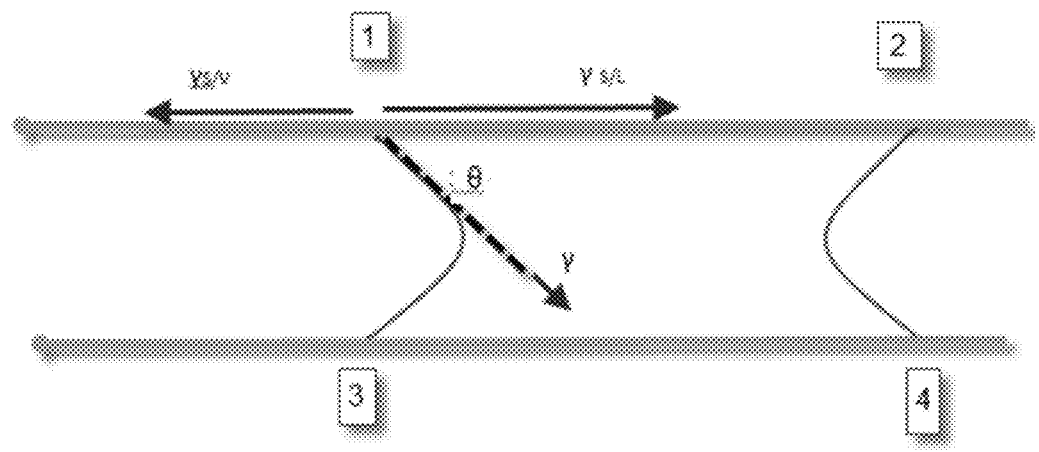
FIG. 15 is a schematic diagram of the forces acting on the solder bead in certain example embodiments.

FIG. 15 is a schematic diagram of the forces acting on the solder bead in certain example embodiments. The subscripts D and E refer to the dynamic and equilibrium contact angles. F is the net force based on the fact that dynamic and equilibrium are not initially equal.

Figure 16:
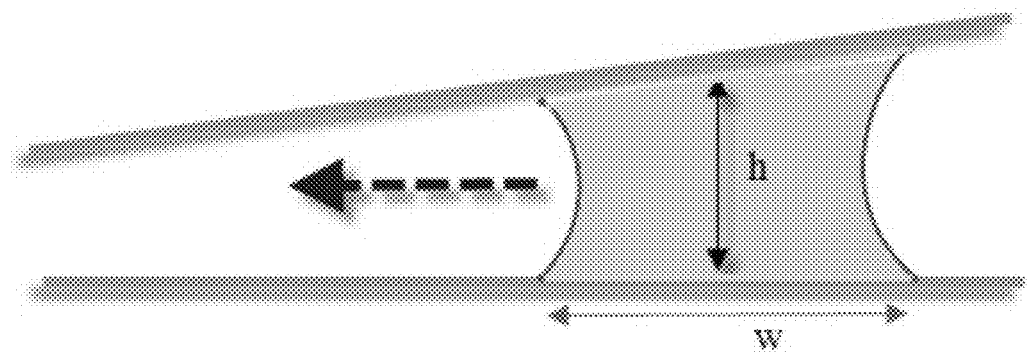
FIG. 16 shows the movement of solder as a function of gap height in certain example embodiments.

FIG. 16 shows the movement of solder as a function of gap height in certain example embodiments. For a wettable surface (e.g., contact angle<90 degrees), liquid solder moves towards the thinner gap height. The opposite is true for a non-wetting surface (e.g., contact angle>90 degrees).

At the solder reflow stage, the sum of Laplacian and clamping pressure is the driving force for the molten solder front to move. The ability to control the solder motion and guide it to specific region on the glass during reflow is useful for this application. The capability of guiding a thermo-capillary flow by surface metallization and patterning provides a powerful approach for controlled solder reflow in certain example embodiments. The metallic coating of certain example embodiments does provide a medium for reactive reflow, which also can be a factor in controlling solder motion.

The following is a description of the spontaneous spreading of a thick layer of molten solder between two parallel sheets of glass. When a VIG cell is subjected to a linear temperature gradient, a thermo-capillary stress (as shown in FIGS. 15-16), $\tau = \partial \gamma lv / \partial T \nabla T$ develops and causes movement of the solder front or contact line. If there is no reactive wetting, the solder front should move from a hot to a cold region. Yet there are other factors that are at work in the dynamics of seal formation. The molten solder thickness or cell gap variation also dictates the shear stress. Physical clamping keeps the cell gap thinner towards the periphery of the VIG, which then keeps the solder flow outward. In addition, increasing the temperature T at the periphery with respect to the center will accentuate reactive diffusion, causing solder to move outwards. If a constant lateral temperature gradient is maintained in the vicinity of the solder location, it is possible to compute the tangential shear pressure $\tau$ acting on the solder. The initial speed U of the solder contact line is controlled by the reactive reflow producing a solder thickness h(t), which eventually becomes h at equilibrium (e.g., with the cell gap dictated by the pillar or spacer height). The inertial force on the solder is compensated by the viscosity of the solder.

$$\frac{\partial T_s}{\partial x} = \frac{dT_{solid}}{dx} = G = \text{constant}$$

$$\tau_W = -\mu \frac{\partial v_x}{\partial z}(x, y, 0) = -\frac{3\mu U}{h} + \frac{\gamma_T G}{2}$$

From the second equation, it can be seen that the gap height as well as the temperature gradient G can have a large effect on solder front motion. The forces can sometimes work in tandem while at times they can oppose each other. However, once these factors that at least in part dictate the flow of solder have been identified, they can be controlled. The above conditions may be met in the making of a metal seal VIG by using a darkened metallic clamp or a mica clamp coated with black enamel frit. This spatially selective modulation of emissivity helps enable the preferential absorption of heat to the glass periphery and therefore helps provide the temperature differential needed to form the seal.

In inert wetting systems, the contact line (CL) region is comparatively simple. The region is characterized geometrically by the dynamic contact angle $\theta_D$. In either case, the contact line moves under a given set of forces, which in spontaneously wetting systems must include the uncompensated Young force $F = \gamma_{S/V} - \gamma_{S/L} - \gamma \cos \theta_D = \gamma (\cos \theta_E - \cos \theta_D)$ normal to the contact line in the plane of the (un-deformed) solid. It is implicitly assumed here that the interfacial energies have their equilibrium values so that S>0. The actual CL configuration in reactive wetting may depend on the nature of the reaction at the S/L interface at the contact line.

In the case of an IMC forming system, a pure molten liquid L (with atoms A) placed on a pure solid substrate S (with atoms B). L reacts with S to form AxBy, and it again is assumed that the solubility of B in A is much greater than the solubility of A in B, a specific example of which is the Ag—Sn system at 240 degrees C., which forms the –phase AgSn$_2$. The intermetallic AxBy lags the CL by a distance r. It is noted that intermetallic may not form at the CL because of a local inability to overcome the nucleation barrier on timescales corresponding to rapid to modest CL speeds. At first glance, then, the CL configuration appears as in FIG. 15; however, the equilibrium state is not the same. As the system approaches equilibrium, the CL slows and as x approaches 0, the slower speed allows nucleation to occur. When the reaction product serves as an effective diffusion barrier on the timescale of wetting, the quasi-equilibrium state $\theta_1 = \theta_{1,E}$, $\theta_2 = \theta_{2,E}$ and $\theta P = \theta P, E$ can occur, where $\theta P$ is the angle between the liquid/product interface and the product/solid interface at r. The driving force per unit length of CL may then be written in terms of this equilibrium as:

$$F = \gamma S/L(t)[\gamma L/P/\gamma S/L(t)\cos \theta_{2,E} - \cos \theta_2(t)] + \gamma L/V(t)[\gamma L/V/\gamma L/V(t)\cos \theta_{1,E} - \cos \theta_1(t)]\gamma S/P(t)[\gamma S/P/\gamma S/P(t) \cos \theta_{P,E} - \cos \theta_P(t)] - G(t),$$

where G(t) is the change in the Gibbs free energy per unit area released by the dissolution/compound-formation reaction. Because G is negative for most IMC formation, the driving force is then is controlled by the reactive reflow process.

During reflow, the solder becomes liquidous and it reactively wets the metallized glass. The Laplacian pressure collapses the cell. It has been observed that the peripheral seal yield and joint reliability are highly dependent on the process conditions during reflow. For example, too short of a time above liquidous and/or a low peak temperature may lead to incomplete melting of the solder preform, which would negatively impact the solder wetting dynamics, or a cold joint potentially could form. If the time above liquidous is too long and the peak temperature is too high, an excessive amount of intermetallic compound may be formed, resulting in an unreliable, brittle solder joint. At the other extreme, if the rate of rise of temperature is not above a threshold, the IMC formation is impeded. Therefore, from a processing standpoint, the dynamics of solder wetting are important in optimizing the reflow temperature profile in terms of the metal seal VIG process yield and solder joint hermetic reliability.

Figure 17:
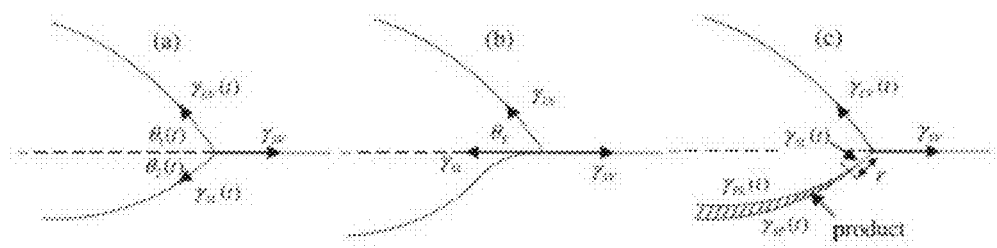
FIG. 17 shows a sequence for reactive reflow between the solder and the metallized surface of the glass in accordance with certain example embodiments.

FIG. 17 shows a sequence for reactive reflow between the solder and the metallized surface of the glass in accordance with certain example embodiments. In the FIG. 17 schematic, the z-axis scale has been magnified compared to the x-axis in order to better depict the IMC formation.

Figure 18:
FIG. 18 is an x-ray of a reflowed solder preform with a controlled wetting front at a 90 degree bend of a VIG made in accordance with certain example embodiments.

FIG. 18 is an x-ray of a reflowed solder preform with a controlled wetting front at a 90 degree bend of a VIG made in accordance with certain example embodiments. As can be appreciated from FIG. 18, there advantageously is an absence of interconnected voids in the bulk of the solder.

Figure 19:
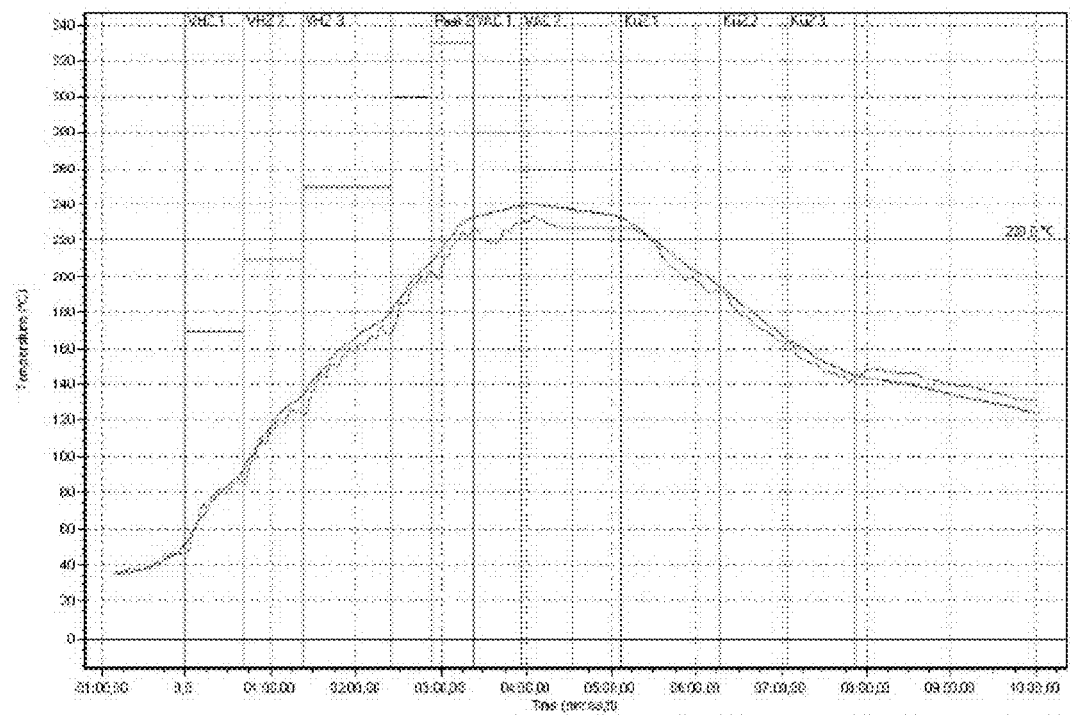
FIG. 19 is an example temperature profile for a reflow process that may be used in certain example embodiments.

FIG. 19 is an example temperature profile for a reflow process that may be used in certain example embodiments. The two lines correspond to temperatures taken at two different probe locations. As can be seen from FIG. 19, there is near symmetry or stability between the ramp up and down at the isopleth. The relatively short temperature cycle helps achieve the seal (even in the ambient atmosphere for the edge seal). This reduces the risk of oxidation and also allows for better control of the solder front at the center line.

The following guidelines may be used in forming a hermetic seal:

- The surface's temperature should reach Tfs=Tm+30 degrees C., where Tm is the melting point of the solder. For example, for a Sn-based solder that starts to soften at 217 degrees C., the minimum temperature of the surfaces in thermal equilibrium should be at least 247 degrees C.
- The rate of change of the temperature dT/dt should be at around 0.5 degrees C./s. This and a sufficiently high Tfs helps ensure that an IMC of proper stoichiometry and thickness is formed with little to no risk of oxidation.
- Uniformity in modulus of Tfs<5 degree C. may be provided, e.g., to limit the thermo-capillary forces resulting in a non-uniform reflowed solder bead (e.g., according to the Marangoni effect).
- Thermalization time τ should satisfy √(Dτ)>IMC thickness at Tfs. The thickness of the IMC may have a direct bearing on the stress and brittleness of the IMC.
- The coefficient of expansion of the surface coating and the solder should match.
- Upon cool down, pressure should be applied past when the solder cools below the isopleth to help ensure uniform contact between the solidifying solder and the surface to which it is being adjoined.
- Clamping should be maintained during formation of the seal to help keep the solder flowing outward, as well as minimizing the risk of debonding during cool down.

The above applies to other viable solder systems, such as InAg, which has a lower Tm at 150 degrees C. These conditions do not by themselves ensure a long term hermetic seal because geometrical constraints, surface cleanliness, and roughness, as well as the atmosphere under which the reflow is performed, may have a bearing on the seal dynamics. The seal can be formed either in air or inert atmosphere or under vacuum in certain example embodiments, e.g., depending on whether the seal is for an edge or the pump-out hole. One advantage to forming the seal under vacuum is the ability to achieve fewer voids in the solder joint form and thus potentially improve the yield for hermetic units. In reflow soldering, a mixture of solder and flux (e.g., solder paste) may be applied into the space between the metallized two parts to be adjoined. Heat then may be applied by means of radiation, conduction, or convection in a controlled environment. Exposure to UV may degrade the vacuum due to carbonates in the glass. Therefore, a getter may be used to help maintain the R value, potentially for the lifetime of product.

Figure 20:
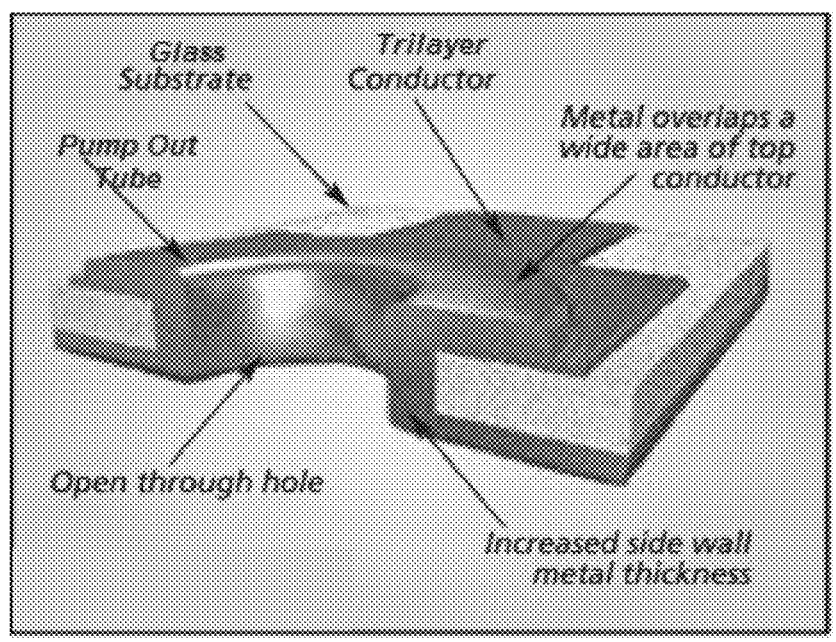
FIG. 20 is a schematic of a metallized pump-out hole in accordance with certain example embodiments.
Figure 21:
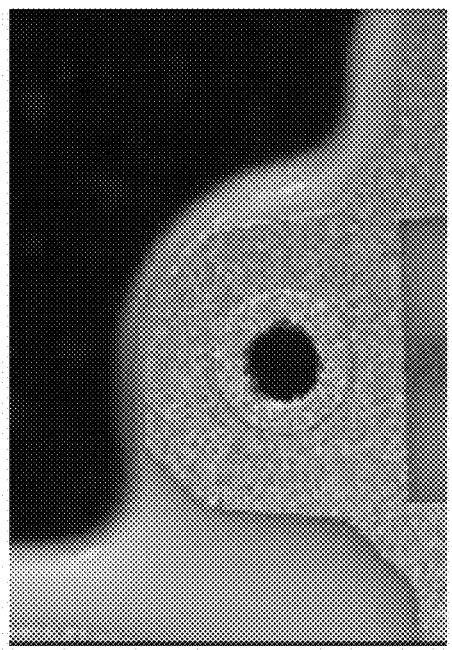
FIG. 21 is a doughnut for holding a solder preform in accordance with certain example embodiments.
Figure 22:
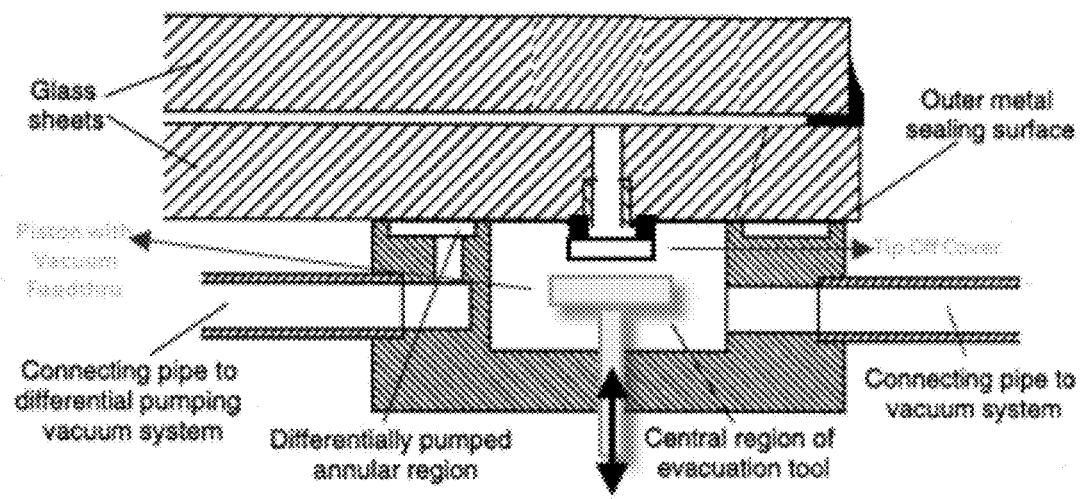
FIG. 22 shows a pump-out tool with a feed-through for a tip-off piston that may be used in certain example embodiments.
Figure 23:
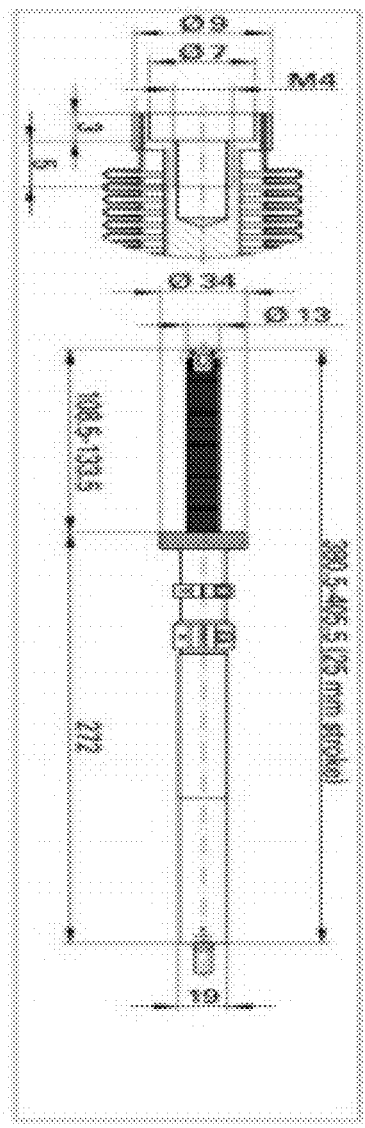
FIG. 23 is a mechanical drawing of a high temperature (200 degree C.) compatible linear vacuum feed-through system with bellows assisted sealing that may be used in certain example embodiments.

It will be appreciated that the foregoing may be useful in forming a peripheral seal, as well as a tip-off hole seal. With respect to the latter, a doughnut-shaped preform may be first placed concentric to the pump hole in an area that is metallized. In certain example embodiments, a 20 mm diameter coating may be deposited on the surface of the glass with no primer when the coating is deposited on the air side of the glass. An additional thin glass or glass of any thickness may be sprayed with the same technique as that described above (e.g., HVWC, HVOF, or the like) on the air side of the glass. This allows the NiCr to react with the Ni to form a Ni—Si bond allowing the adhesion to be greater than 300 PSI by standard pull test and by lap shear test, with breakage occurring at the glass interface rather than at the solder/coating or within the solder itself. Otherwise, a silicon-inclusive coating may be formed to increase adhesion. See FIGS. 20-23 in this regard. FIG. 20 is a schematic of a metallized pump-out hole in accordance with certain example embodiments, FIG. 21 is a doughnut for holding a solder preform in accordance with certain example embodiments, and FIG. 22 shows a pump-out tool with a feed-through for a tip-off piston that may be used in certain example embodiments. The tip cover in FIG. 22 may be metallized glass or a metal diaphragm, and an optional secondary polymer seal may be provided in certain example embodiments. FIG. 23 is a mechanical drawing of a high temperature (200 degree C.) compatible linear vacuum feed-through system with bellows assisted sealing that may be used in certain example embodiments. The VIG unit is then filled with an inert gas or mixture and heated to the softening temperature of the solder at a pressure 100-500 mTorr. The energy source can be localized radiative or resistive heating, delocalized convective, and/or the like.

Prior to the solder reaching the melting point, a plasma can be excited in order to clean the VIG prior to evacuation of the unit. The plasma can be struck using an inductive technique, by applying a voltage between the peripheral seal and the pump-out tool or the metallized cover plate that is being slowly brought into contact to the pump out hole area as the whole unit is being evacuated to a pressure below $10^{-5}$ Torr, etc.

$Sn_3Ag_{0.5}Cu$ and InAg solder preforms were used with a metallized hole to achieve various topologies for the tip-off seal. The process generally involves solder melting, initial solder solidification, and post-solder solidification. From several trials of in-situ observations, it was found that the solidification of a solder ball begins near the metallized land on the glass and propagates toward the top of the solder ball. From the results of these in-situ and microstructural observations, the solidification of $Sn_3Ag_{0.5}Cu$ solder balls was found to be inhomogeneous and locally time dependent, regardless of their position, and the solidification initiation of each solder ball on a chip solder package (CSP) was found to be random. These facts suggest that the solidification of each solder ball is influenced by the presence of some nuclei for solidification such a voids, inclusions, oxide films, and interface intermetallics.

Figure 24:
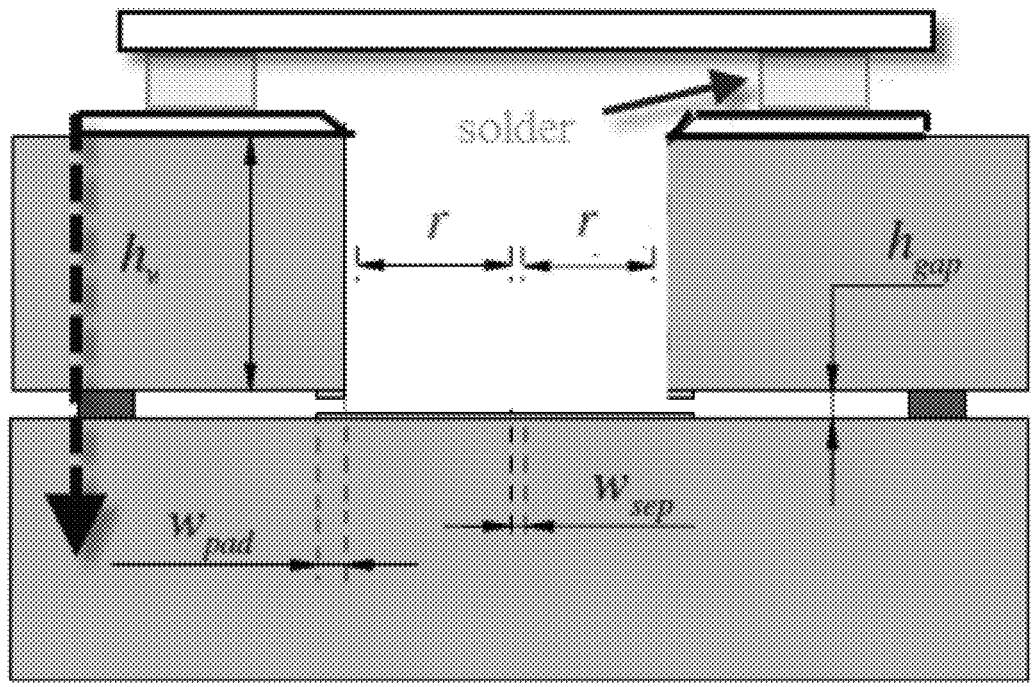
FIG. 24 is a schematic view of a cover with a doughnut-shaped solder preform being placed over and around a pump-out hole proximate to metallized areas of a substrate, in accordance with certain example embodiments.
Figure 25:
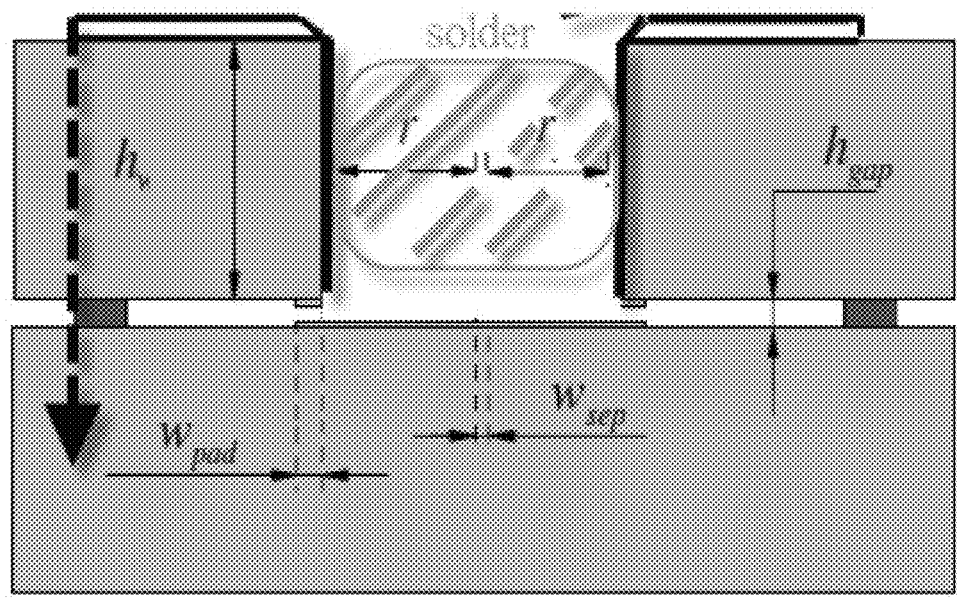
FIG. 25 is a schematic view of a solder preform being inserted into a pump-out hole proximate to metallized inner edges of the pump-out hole, in accordance with certain example embodiments.
Figure 26:
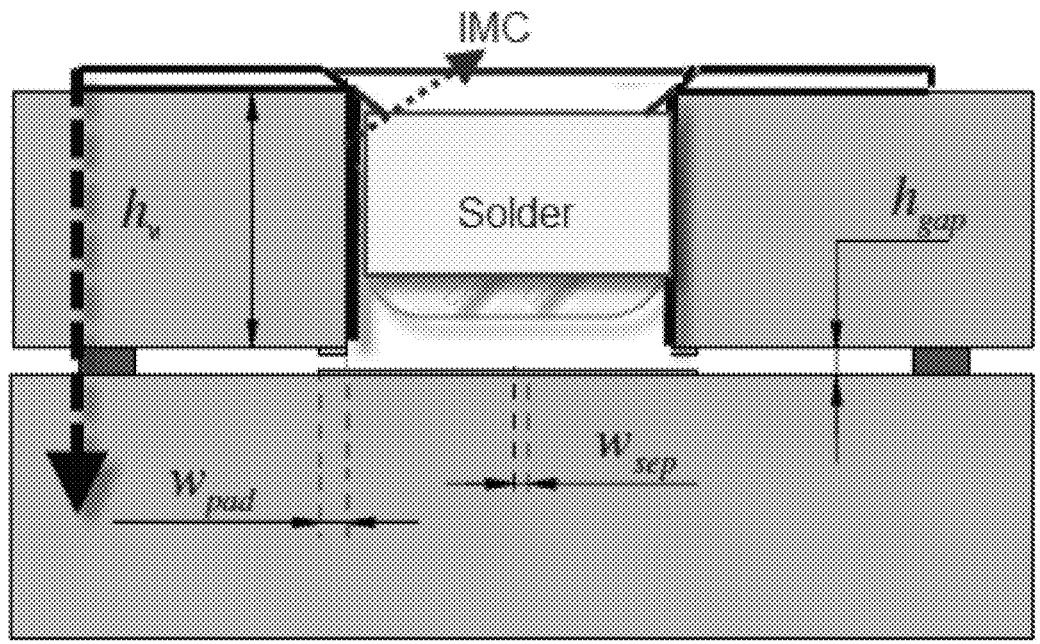
FIG. 26 is a schematic view of a solder preform being inserted into a pump-out hole proximate to metallized inner edges of the pump-out hole, in accordance with certain example embodiments.

FIG. 24 is a schematic view of a cover with a doughnut-shaped solder preform being placed over and around a pump-out hole proximate to metallized areas of a substrate, in accordance with certain example embodiments. In the FIG. 24 example, the distance from the edge of the hole to the far right of the cap may be 2r. Both the tube and the top glass plate may be metallized in certain example embodiments. Similar to FIG. 24, FIG. 25 is a schematic view of a solder preform being inserted into a pump-out hole proximate to metallized inner edges of the pump-out hole, in accordance with certain example embodiments. Similar to FIGS. 24 and 25, FIG. 26 is a schematic view of a solder preform being inserted into a pump-out hole proximate to metallized inner edges of the pump-out hole, in accordance with certain example embodiments. In FIG. 26, the preform may be through of as a bead plug, and the hole and cover plate may be preferentially wetted.

Figure 27:
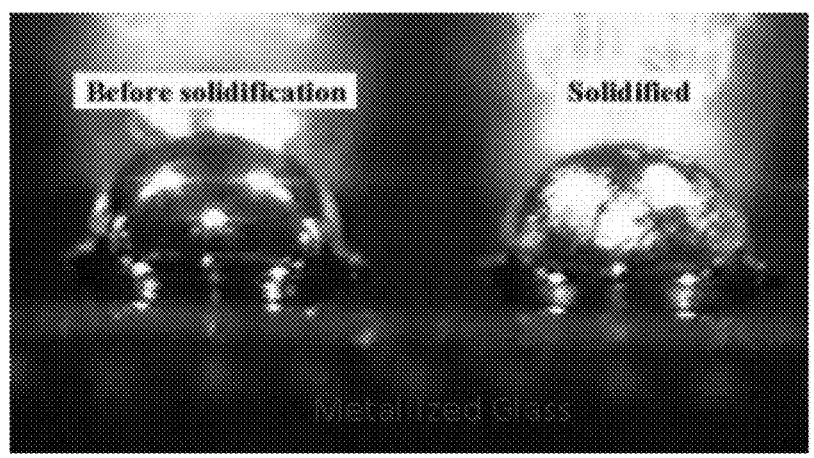
FIG. 27 shows images of the formation of a solder bead through a metallized hole under vacuum.

FIG. 27 shows images of the formation of a solder bead through a metallized hole under vacuum.

In terms of the mechanics of seal formation, the assembly is heated to and held at a temperature above the melting point of the solder and then allowed to cool. During this process the solder melts and fills the gap in between the work pieces. The filling process depends largely on the Laplacian pressure $\Delta P$, which can be expressed as $\Delta P = \gamma s (T)(1/Wm - 2 \cos \theta/We)$, where Wm is the width of the metal coating and We is the gap between the parts to be adjoined. For Wm>>We, the Laplacian pressure is then given by $\Delta P = -2 \gamma s (T) (\cos \alpha/We)$.

For highly wettable solder ($0<\theta<\pi/2$), Laplacian pressure is negative, which implies an attractive force acting between the two sheets of VIG glass sheets. For $\theta>\pi/2$, the force is repulsive. Therefore, the contact angle (which in turn is controlled by intermolecular forces) is an important parameter in that it also controls the extent of wetting WL. WL~Wm. It is noted that delta P depends on T via the dependence of surface tension. This fact can be used to keep the solder in a selective peripheral location by having the temperature of the edge hotter than the rest of the glass.

With respect to the volumetric constraints for a peripheral seal, for an initial solder preform of dimension Ws and ts, the conservation of volume per unit length of solder can be expressed as $Wl \times We < Ws \times ts$. This sets the constraints to be $WL < Ws \times ts/We$, for a void free seal.

With respect to the volumetric constraints for a pump-out hole seal, the minimum amount of solder Vs to completely fill the cylindrical hole is given by the formula $V = \pi h r^2$. To make a hermetic plug, a fraction of this volume is needed. The volumetric flow rate Q is then given by $Q = (Vs \times P)/\mu$.

Reflow Time $\tau$ may be expressed as $\tau = V/Q = (V/Vs) \times P/\mu$. The volumetric flow rate of the solder is inversely proportional to the reflow time.

Figure 28:
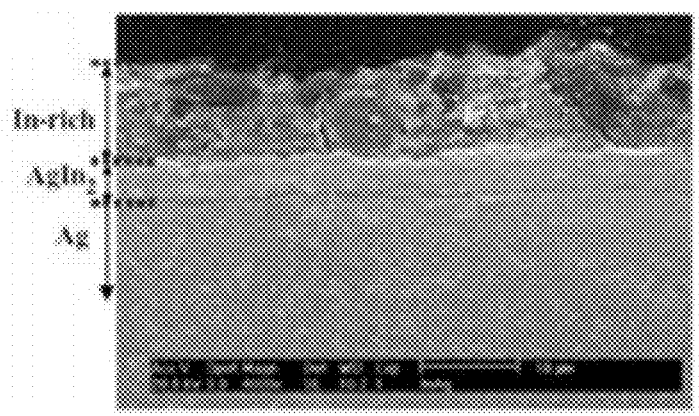
FIG. 28 is a cross-sectional view showing what happens to an AgIn preform during a reactive reflow process of 4 min. at 140 degrees C.
Figure 29:
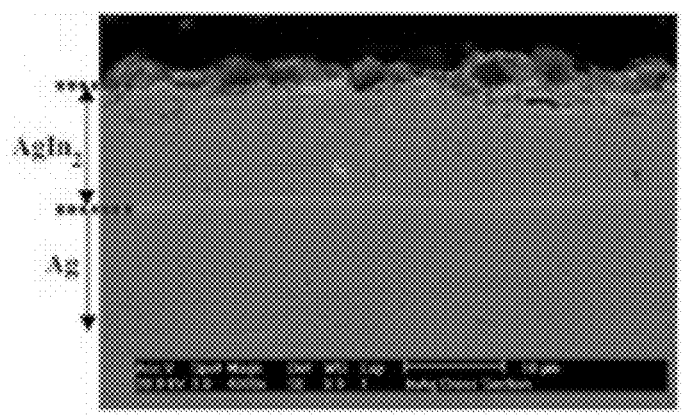
FIG. 29 is a cross-sectional view showing what happens to an AgIn preform during a reactive reflow process of 8 min. at 150 degrees C.
Figure 30:
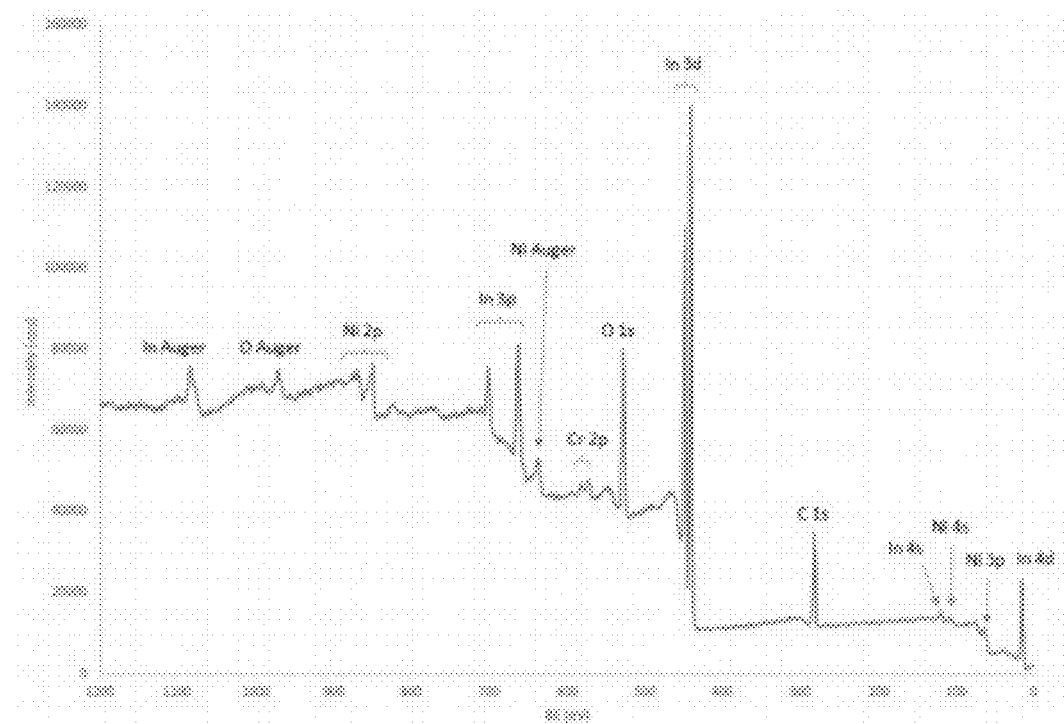
FIG. 30 is a high-resolution XPS of the InAg IMC layer that is formed in certain example embodiments.

FIG. 28 is a cross-sectional view showing what happens to an AgIn preform during a reactive reflow process of 4 min. at 140 degrees C., and FIG. 29 is a cross-sectional view showing what happens to an AgIn preform during a reactive reflow process of 8 min. at 150 degrees C. FIG. 30 is a high-resolution XPS of the InAg IMC layer that is formed in certain example embodiments.

A solderable joint can self-form via capillary action and helps ensures the distribution of the filler metal solder into the joint. The proper shape design of the joint, the proper priming of the adjoining surfaces, as well as the application of the principles described above aid in achieving the desired level of hermeticity. Further guidelines that may be followed are provided below.

1. Good Fit and Uniform Clearances

Figure 31:
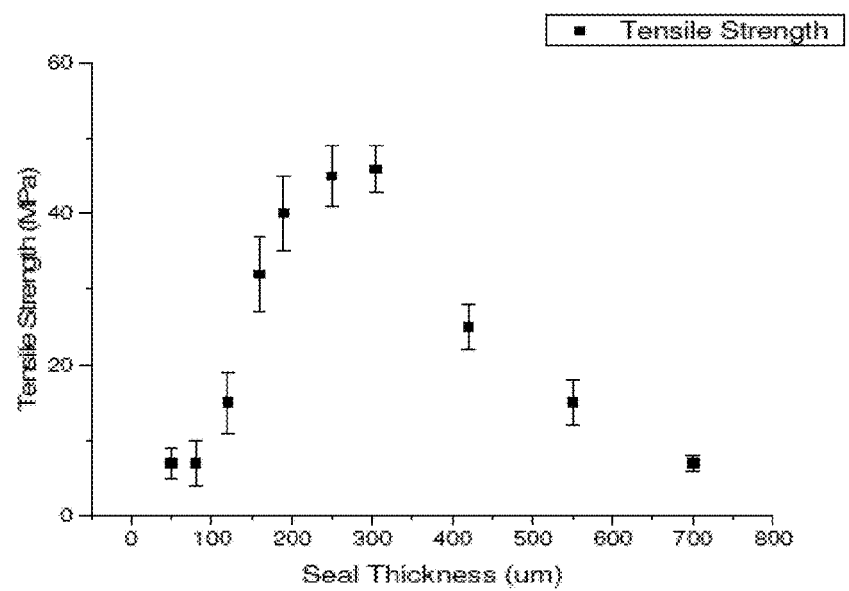
FIG. 31 shows experimental data on how the tensile strength of a soldered joint varies as a function of the joint gap thickness.

As will be appreciated from the above, solder reflow uses the principle of capillary action to distribute the molten filler metal between the metallized surfaces of glass. Therefore, during the reflow operation, care should be taken to maintain a clearance between the glass base metallized layer to allow capillary action to work most effectively. A close clearance thus may be desirable in most example instances. FIG. 31 shows experimental data on how the tensile strength of a soldered joint varies as a function of the joint gap thickness. In this sense, FIG. 31 plots the strength of the seal vs. gap dimension. The data can be explained by a model derived on capillary pressure and void formation that predicts that the tensile strength of the brazed joint varies with the amount of clearance between the parts being joined. The area of the seal was kept near constant and the variance in the data probably correlates with the joint area variance.

The strongest joint (50 MPa) is achieved when the joint clearance is about 275 microns. When the clearance is narrower than this, it may be harder for the molten solder filler metal to distribute itself adequately throughout the entire joint, and joint strength may be reduced because of void formation. Provided that there is no defect on the metallized coating, for example, it is possible to surmise that the hermeticity of such a joint is correlated to its tensile strength. Conversely, if the gap is wider than necessary, the strength of the joint will be reduced almost to that of the filler metal itself. Also, capillary action is reduced, so the filler metal may fail to fill the joint completely. This may give rise to micro-bubbles or voids that again lower joint strength and the probability of forming a hermetic seal. An advantageous clearance for a soldered joint for two concentric cylinders (and thus for an example VIG pump-out hole) thus is about 275 microns. It is noted that the gap in the VIG set at around 250-300 microns is in the optimum range for the strength of the VIG peripheral seal. But in ordinary day-to-day reflow, this level of precision may not be necessary to get a sufficiently strong and hermetic joint.

In the case of the flat cap seal, the thickness of the solder need not be optimized for mechanical strength as it may be for hermeticity and lifetime. This is because the seal is done via thermocompression. Capillary action operates over a range of clearances, which opens up the process window. Clearances ranging from 0.025 mm to 0.130 mm still produce joints of 10-30 MPa tensile strength. An easy slip fit can also provide an adequate soldered joint between two tubular parts. The metal-to-metal contact gap may be all the clearance needed, since the average "finish" of coating provides enough surface roughness to create capillary "paths" for the flow of molten filler metal. However, because the IMC is also formed reactively, there is an optimum surface roughness window that may be met prior to seal formation. If the surfaces are too highly polished surfaces, on the other hand, they may tend to restrict the solder metal flow. This may be compensated for by the additional external pressure applied and also active pumping. Sealed joints may be made at the Tm temperature when the solder changes phase. Thus, it may be desirable to take into account the coefficient of thermal expansion of the metals being joined. A flat tip-off plate made of either metallized glass or a metal sheet may be adjoined to the metallized surface around and in the pump-out hole area as shown and described herein. Thermo-compression is used in the seal formation, because it helps compensate for deflection or distortion that may occur as a result of uneven temperatures of the parts that make the seal.

Figure 32:
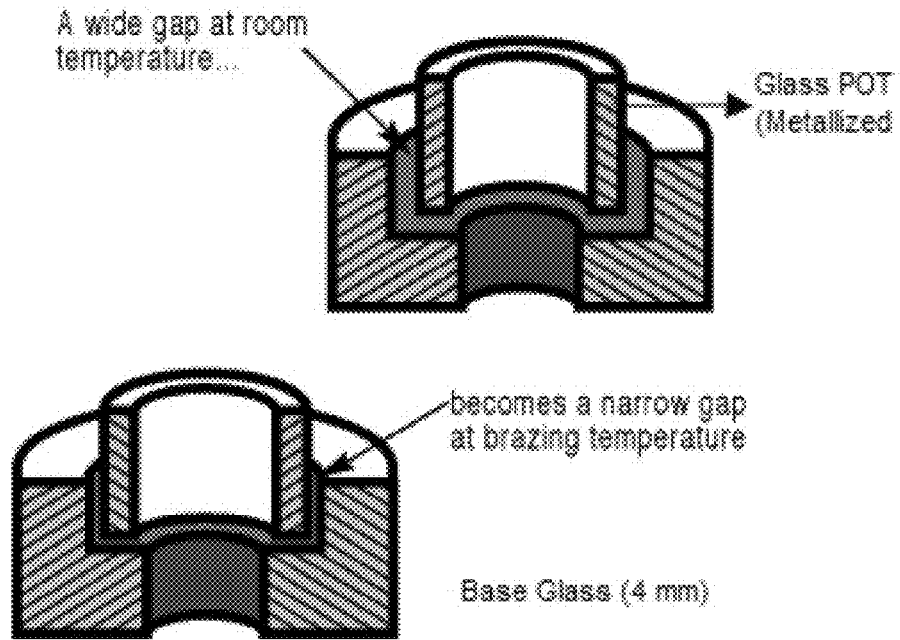
FIG. 32 shows how an exemplary concentric tubular gap solderable joint may be used in connection with certain example embodiments.

FIG. 32 shows how an exemplary concentric tubular gap solderable joint may be used in connection with certain example embodiments. Concentric tubular assemblies of dissimilar metals (e.g., metal plugs or plates against metallized glass) can also be joined by reactive reflow. An example involves brazing/reflowing a brass bushing into a steel sleeve. Brass expands more than steel when heated. Thus, if the parts are machined to have a room temperature clearance of 0.002-0.003" (0.051-0.076 mm), by the time the parts are heat to brazing temperatures, the gap may have closed completely. One possible solution is to allow a greater initial clearance, so that the gap at reflow temperature will be about 80 microns. In addition, because the metal coating is deposited to the glass, it will undergo compressive stress during heating and go tensile during cooling.

The allowance that should be made for expansion and contraction may depend on the nature and sizes of the metals being joined and the configuration of the joint itself. Although there are many variables involved in pin-pointing exact clearance tolerances for each situation, it has been found that an account of the different expansion rates of metals when heated provides a good starting point for further investigation.

2. Cleaning the Metallized Surfaces

Capillary action works in a predictable and repeatable manner when the surfaces of the metals are clean. Contaminants such as oil, grease, and oxidation scale should be removed to achieve good results. Surface contaminants may form a barrier between the base metal surfaces and the brazing materials. An oily base metal, for example, may repel molten solder, leaving bare spots that oxidize under heat and result in voids. Oil and grease may carbonize when heated, forming a film over which the filler metal may not wet and flow. Cleaning the metallized parts should be performed in the right sequence. Oil and grease may be removed first, followed by removal of metal oxides. This can be achieved by dipping the parts into a suitable degreasing solvent, by vapor degreasing, etc. If the metal surfaces are coated with oxide or scale, chemical and mechanical polishing can be used. For chemical removal, making sure that the chemicals are compatible with the base metals being cleaned, and that no acid traces remain in crevices or blind holes, may be beneficial.

Mechanical removal may call for abrasive cleaning. Cleaning process can be expedited by using emery cloth, followed by air gun operations. Reflow should be performed once the surfaces to be adjoined are thoroughly cleaned.

Because the VIG seal formation can be achieved in vacuum, another efficient way to clean surfaces is to degas the heated surface to an evacuated environment prior to reflow or expose the part to a plasma glow discharge.

3. Reflow in Inert Atmosphere or Vacuum

As has been shown by the assignee, vacuum processing has the beneficial effect of forming a seal with extremely low void density. Interconnected voids and/or porosity has a direct bearing on leak rate. The likelihood of leaks increases when reflow is performed in air. Regular fluxing agents have a corrosive effect on the metallic coating and thus should be avoided. Reflow in an inert atmosphere has been shown to be another alternative to vacuum processing. This reduces the risk of a leak due to oxidation of solder or the presence of interconnected pores.

Reflow operation in air is not recommended. However, there are exceptions. For example, copper-to-copper can be attempted in air without flux, e.g., by using a filler metal solder that has a gettering agent. (The phosphorus in these alloys acts as a "fluxing agent" on copper.) Incorporation of rare earth dopants into the solder (without changing its phase) is also recommended if the assembly is at atmosphere. A controlled atmosphere with a gaseous mixture contained in an enclosed space, usually a brazing furnace, may be desirable. The atmosphere (such as an atmosphere including hydrogen, nitrogen or dissociated ammonia) may completely envelop the assemblies and, by excluding oxygen, help prevent oxidation. Even in controlled atmosphere, however one may find that a small amount of solder paste (with flux) can improve the wetting action of the solder filler metal. Eventually, a vacuum environment may be used to remove any traces of organics from the filler prior to tip off.

4. Clamping Assembly for Soldering

The cleaned parts of the metal seal VIG assembly or subassembly may be held in position for reflow by mechanical and/or electromechanical clamping at the periphery. The lineal force needed is in some instances on the order of 2-5 N/inch of periphery. This helps ensure the correct alignment during the heating and cooling cycles, so that both capillary action and reactive reflow can be harnessed to make the seal. Uniform clamping also helps in maintaining a uniform gap height with little or no wedging effect. This helps with keeping the contact line of the solder within the metallized areas. The clamps may be coated with a high emissivity coating that would maximize the absorption of heat into the glass especially when radiative ovens are used.

Figure 33:
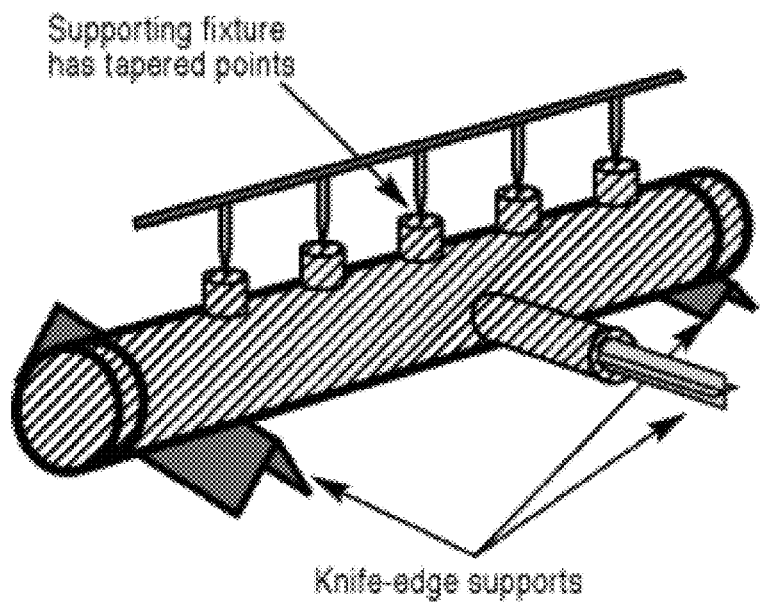
FIG. 33 is an example support fixture that may be used in connection with certain example embodiments.

If the configuration is too complex for self-support or clamping, it may be beneficial to use a support fixture. Such a fixture may be designed for the least possible mass, and the least contact with the parts of the assembly. (A cumbersome fixture that contacts the assembly broadly will conduct heat away from the joint area.) It is recommended to use pin-point and knife-edge design to reduce contact to the minimum. See FIG. 33 for an example support fixture that may be used in connection with certain example embodiments.

Materials used in the fixture should be poor heat conductors, such as stainless steel, Inconel, ceramics, and mica. Because they are poor conductors, they draw the least heat away from the joint during the rapid time scale of the seal formation. A simple mechanical holding device, even paper clips, is desirable, because its only function is to hold the parts together while the permanent joint is made by the reflow.

5. Plasma Cleaning of the VIG Cavity

VIG units generally have long-term R value stability with UV exposure time. The low temperature process of the peripheral metal seal implies that extra care should be taken in degassing the unit prior to final tip-off sealing. Plasma scrubbing or cleaning of the VIG is usually a two-step operation, whereby several gas purge cycles are followed by striking a high voltage discharge in the gap. Because the small gap is approximately the same size as the dark space sheath (under the condition P×d), it may be difficult to strike and sustain a transverse capacitively coupled plasma inside a VIG. However a plasma discharge can be inductively struck at pressures as low as 200-400 mTorr. A remote ozonated plasma can also be used to degas the VIG unit via the pump out tool. The plasma facilitates the removal of chemisorbed water on the glass surface, as well as organic residues from the glass. The plasma cleaning process may take place concurrently with the tip off seal formation.

6. Solder Reflow Cell Assembly

The actual accomplishment of the hermetic solder joint may involve heating the assembly to at least 30 K above the Tm of the solder, reactively wetting a metallized surface while simultaneously allowing capillary flow of the solder filler metal through the joint gap. For processing a peripheral seal, heat can be applied to the entire VIG cell; however, the area with solder base metals should maintain a higher temperature. A temperature differential of at least 5 K should be sufficient. For example, in the fabrication of a small assembly like the tip-off seal, localized heating may be used because it facilitates attaining a dT/dt in the range of 0.5 degrees C./s and helps keep the solder in the periphery of the unit. During the fabrication of a large VIG assembly, heat may be selectively applied around the joint. Bulk resistive heating in vacuo may involve high power heaters as the VIG size increases. Localized resistive heating may be better suited to cases, e.g., and may be used for the tip-off hole.

Infrared heating using a lamp is also an alternative, as it will be able to heat the solder locally via the heat absorbed by the glass. Some solders are good conductors and consequently carry off heat faster into cooler areas. Others are poor conductors and tend to retain heat and overheat readily. The good conductors may need more heat than the poor conductors, simply because they dissipate the heat more rapidly.

It will be appreciated that the tri-layer and bi-layer metallic stacks may be used in pump-out hole seal related embodiments. These coatings may be formed via HVOF, HVWC, and/or any other suitable technique.

The terms "heat treatment" and "heat treating" as used herein mean heating the article to a temperature sufficient to achieve thermal tempering and/or heat strengthening of the glass-inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, up to about 10 minutes, up to 15 minutes, etc., in certain example embodiments.

It is noted that the VIG units may be used in a number of different applications including, for example, residential and/or commercial window applications, skylights, merchandizers, OLED and/or other display packages, etc. One or both substrates of the VIG unit may be heat treated (e.g., heat strengthened and/or thermally tempered) in different example embodiments. In certain example embodiments, a laminate of glass (e.g., glass/PVB or glass/EVA) can be mated with itself or a monolithic glass lite to make a VIG unit with or without a pump-out tube.

Although certain example embodiments have been described in connection with VIG units, it will be appreciated that the example techniques described herein may include one or more substrates formed from a material other than glass. In other words, because the example techniques herein are able to form hermitic seals at low processing times and temperatures, it becomes possible to use alternative substrate materials such as, for example, plastics, Plexiglas, etc. As alluded to above, such materials may be used as one or both substrates in a vacuum insulating panel (VIP) unit or the like. Any or all of the features, aspects, techniques, configurations, etc., as described above can be used in such VIP units. Moreover, it will be appreciated that the example VIG and VIP units described herein may be laminated to another substrate in certain example embodiments.

The terms "peripheral" and "edge" used herein in connection with seals, for example, do not mean that the seal(s) and/or other element(s) is/are located at the absolute periphery or edge of the unit, but instead mean that the seal(s) and/or other element(s) is/are at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s).

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a method of making a vacuum insulated glass (VIG) unit is provided. A VIG unit subassembly includes first and second glass substrates, a plurality of spacers helping to maintain the first and second glass substrates in substantially parallel spaced apart relation to one another, and an edge seal. The first glass substrate has a hole formed therein, with the hole being usable to evacuate a cavity defined between the first and second glass substrates. A first multi-layer thin film coating is formed on a portion of the first substrate that is around and/or on an inner diameter of the hole, with the first multi-layer thin film coating including at least one layer comprising a metal. A solid solder alloy pre-form is provided in and/or around the hole, with the solid solder alloy pre-form being in direct physical contact with at least a part of the first multi-layer thin film coating and comprising metal. A seal member is provided over and/or in hole so that at least part of the seal member is in physical contact with the solid solder alloy pre-form. An hermetic hole seal is formed by reactively reflowing the solid solder alloy pre-form to cause material from the first multi-layer thin film coating to diffuse into the solder alloy material and vice versa, in making the VIG unit.

In addition to the features of the previous paragraph, in certain example embodiments, the seal member may have a second multi-layer thin film coating formed thereon, with the first and second layer thin film coatings at least initially having the same thin film layers; and the solid solder alloy pre-form may be in direct physical contact with at least a part of the second multi-layer thin film coating. In addition, in certain example embodiments, the forming of the hermetic hole seal may also cause material from the second multi-layer thin film coating to diffuse into the solder alloy material and vice versa, in making the VIG unit.

In addition to the features of either of the two previous paragraphs, in certain example embodiments, the seal member may be a plug that is inserted into the hole, a plate that covers the hole, a plate with a plug protruding therefrom with the plate covering the hole and the plug extending into the hole, and/or the like.

In addition to the features of any of the three prior paragraphs, in certain example embodiments, the seal member may be formed from a metal, metal alloy, and/or glass.

In addition to the features of any of the four prior paragraphs, in certain example embodiments, the first (and optional second) multi-layer thin film coating may include a layer comprising Ni.

In addition to the features of any of the five prior paragraphs, in certain example embodiments, the first (and optional second) multi-layer thin film coating may include a layer comprising Ag sandwiched between layers comprising Ni.

In addition to the features of any of the six prior paragraphs, in certain example embodiments, the first (and optional) multi-layer thin film coating may include, in order moving away from the surface on which it is formed, a first layer comprising Si, a second layer comprising Ni, and a third layer comprising Ag.

In addition to the features of any of the seven prior paragraphs, in certain example embodiments, the first (and optional) multi-layer thin film coating may include, in order moving away from the surface on which it is formed, a first layer comprising Ni and/or Cr and a second layer comprising Ag.

In addition to the features of any of the eight prior paragraphs, in certain example embodiments, the solid solder alloy pre-form may be formed from an indium silver alloy, SAC, Sn—Pb, SnBiAg, SATi, or SATiRE. For example, in addition to the features of any of the eight prior paragraphs, in certain example embodiments, the solid solder alloy pre-form may comprises either (a) Sn, Ag, and Cu, or (b) In and Ag. In addition to the features of any of the eight prior paragraphs, in certain example embodiments, the solid solder alloy pre-form may be based on Sn and may include at least one other material selected from the group consisting of post-transition metals or metalloids; Zintl anions from group 13, 14, 15, or 16; and transition metals.

In addition to the features of any of the nine prior paragraphs, in certain example embodiments, a secondary seal may be formed over and/or around the hole seal.

In addition to the features of any of the 10 prior paragraphs, in certain example embodiments, the hole seal may formed while the VIG unit subassembly is held under vacuum.

In addition to the features of any of the 11 prior paragraphs, in certain example embodiments, the edge seal may be formed while the VIG unit subassembly is held under a first vacuum pressure, the hole seal may be formed while the VIG unit subassembly is held under a second vacuum pressure, and the second vacuum pressure may be lower than the first vacuum pressure.

In addition to the features of any of the 12 prior paragraphs, in certain example embodiments, the hole seal may be formed at a temperature of no more than 300 degrees C. (e.g., a temperature of no more than 180 degrees C.).

In addition to the features of any of the 13 prior paragraphs, in certain example embodiments, plasma- and/or ozone-cleaning the cavity of the cavity may be performed while forming the hermetic hole seal but prior to the solid solder alloy pre-form melting.

In addition to the features of any of the 14 prior paragraphs, in certain example embodiments, gettering oxides formed during formation of the hole seal may be performed.

In addition to the features of any of the 15 prior paragraphs, in certain example embodiments, the VIG unit may be made without a pump-out tube that needs to be tipped-off or otherwise closed.

In addition to the features of any of the 16 prior paragraphs, in certain example embodiments, the first multi-layer thin film coating may be formed in an at least partially reducing atmosphere.

In addition to the features of any of the 17 prior paragraphs, in certain example embodiments, the first multi-layer thin film coating may be burnished to remove unwanted oxide, nitride, and/or carbon content therefrom, e.g., prior to formation of the hole seal.

In addition to the features of any of the 18 prior paragraphs, in certain example embodiments, each layer in the first multi-layer thin film coating may be formed to have a porosity of less than 2% and an adhesion or bond strength of at least 10 MPa, and/or the first multi-layer thin film coating as a whole has an RMS roughness (Ra) of less than 2 microns and an adhesion or bond strength of at least 20 MPa.

In addition to the features of any of the 19 prior paragraphs, in certain example embodiments, during the formation of the hermetic hole seal, the first and second substrates may reach a temperature sufficiently low to prevent the loss of temper strength.

In addition to the features of any of the 20 prior paragraphs, in certain example embodiments, at least one of the substrates may be a glass substrate that is heat treated.

In addition to the features of any of the 21 prior paragraphs, in certain example embodiments, at least one of the substrates may be a glass substrate that is thermally tempered, and each said glass substrate that is thermally tempered may lose no more than 10% temper strength during the making of the VIG unit.

In addition to the features of any of the 22 prior paragraphs, in certain example embodiments, hermetic hole seal may comprise material from the solid solder alloy pre-form and on each side thereof and in order moving away therefrom, at least one inter-metallic compound (IMC) layer, an activated energetic spray deposition deposited silver-inclusive layer, and an activated energetic spray deposition deposited nickel-inclusive layer.

In certain example embodiments, there is provided a vacuum insulating glass (VIG) unit that may be made using the method of any of the 23 prior paragraphs. For example, in certain example embodiments, a VIG unit comprises first and second substantially parallel spaced apart glass substrates, with at least one of the first and second substrates being a heat treated glass substrate; a plurality of spacers provided between the first and second substrates; an edge seal; and a cavity at least partially defined by the first and second substrates and the edge seal, with the cavity being evacuated to a pressure less than atmospheric. A hole seal member is provided in and/or over a hole formed in the first substrate that was used during VIG unit manufacturing to evacuate the cavity. The hole seal member and the first substrate are hermetically sealed to one another via a hole seal formed by reactively reflowing a solid solder alloy pre-form comprising metal, which causes (a) material from a first multi-layer thin film coating pre-provided on the first substrate to diffuse into the solder alloy material and vice versa, and (b) formation of an inter-metallic compound (IMC) between an uppermost layer of the first multi-layer thin film coating and the reactively reflowed solder.

In addition to the features of the previous paragraph, in certain example embodiments, the first multi-layer thin film coating may comprise an activated energetic spray deposition deposited silver-inclusive layer, and an activated energetic spray deposition deposited nickel-inclusive layer, at least a portion of the first multi-layer thin film coating remaining in the VIG unit.

In addition to the features of either of the two previous paragraphs, in certain example embodiments, the alloy material may comprise either (i) Sn, Ag, and Cu, or (ii) In and Ag.

In addition to the features of any of the three prior paragraphs, in certain example embodiments, the hole seal may have a strength sufficient to imbue the VIG unit with a failure mode in which glass from the first substrate and/or material from the hole seal member breaks instead of, or at least before, the hole seal fails.

In addition to the features of any of the four prior paragraphs, in certain example embodiments, at least one of the first and second substrates may be thermally tempered, with each thermally tempered substrate retaining at least 90% of its temper strength in the VIG unit.

In addition to the features of any of the five prior paragraphs, in certain example embodiments, the hole seal member may have a second multi-layer thin film coating pre-provided thereto, with the first and second multi-layer thin film coatings having the same layers as one another.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vacuum insulating glass (VIG) unit, comprising:
first and second substantially parallel spaced apart glass substrates, at least one of the first and second glass substrates being a heat treated glass substrate;
a plurality of spacers provided between the first and second substrates;
an edge seal;
a cavity between the first and second glass substrates, the cavity being evacuated to a pressure less than atmospheric; and
a hole seal member at least partially located in a pump-out hole formed in the first substrate that was used during VIG unit manufacturing to evacuate the cavity, the hole seal member and the first substrate being hermetically sealed to one another in the pump-out hole via a hole seal formed by reactively reflowing a solid solder alloy pre-form comprising metal, which causes (a) material from a first multi-layer thin film coating pre-provided on the first substrate to diffuse into the solder alloy material and vice versa, and (b) formation of an inter-metallic compound (IMC) between an uppermost layer of the first multi-layer thin film coating and the reactively reflowed solder.

2. The VIG unit of claim 1, wherein the first multi-layer thin film coating comprises an activated energetic spray deposition deposited silver-inclusive layer, and an activated energetic spray deposition deposited nickel-inclusive layer, at least a portion of the first multi-layer thin film coating remaining in the VIG unit.

3. The VIG unit of claim 1, wherein the alloy material comprises either (i) Sn, Ag, and Cu, or (ii) In and Ag.

4. The VIG unit of claim 1, wherein at least one of the first and second substrates is thermally tempered, each thermally tempered substrate retaining at least 90% of its temper strength in the VIG unit.

5. The VIG unit of claim 1, wherein the hole seal member has a second multi-layer thin film coating pre-provided thereto, the first and second multi-layer thin film coatings having the same layers as one another.

6. The VIG unit of claim 1, wherein the first multi-layer thin film coating was formed in the pump-out hole.

7. A vacuum insulating glass (VIG) unit, comprising:
first and second substantially parallel spaced apart glass substrates, at least one of the first and second glass substrates being a heat treated glass substrate;
a plurality of spacers provided between the first and second substrates;
an edge seal;
a cavity between the first and second glass substrates, the cavity being evacuated to a pressure less than atmospheric; and
a hole seal member provided at least partially in a pump-out hole formed in the first substrate that was used to evacuate the cavity, the hole seal member and the first substrate being hermetically sealed to one another in the pump-out hole via a hole seal comprising an inter-metallic compound (IMC) between an uppermost layer of a first multi-layer thin film coating and reactively reflowed solder.

* * * * *